(12) United States Patent
Dhanoa

(10) Patent No.: US 8,782,115 B1
(45) Date of Patent: Jul. 15, 2014

(54) HARDWARE ARCHITECTURE AND SCHEDULING FOR HIGH PERFORMANCE AND LOW RESOURCE SOLUTION FOR QR DECOMPOSITION

(75) Inventor: Kulwinder Dhanoa, Windsor (GB)

(73) Assignee: Altera Corporation, San Jose, CA (US)

( * ) Notice: Subject to any disclaimer, the term of this patent is extended or adjusted under 35 U.S.C. 154(b) by 1392 days.

(21) Appl. No.: 12/148,385

(22) Filed: Apr. 18, 2008

(51) Int. Cl.
- G06F 7/32 (2006.01)
- G06F 7/38 (2006.01)
- H04K 1/10 (2006.01)
- H04L 27/28 (2006.01)
- H04B 7/02 (2006.01)
- H04L 1/02 (2006.01)

(52) U.S. Cl.
USPC ............ 708/520; 708/514; 375/260; 375/267

(58) Field of Classification Search
USPC .................. 708/514, 520, 607; 375/260–267, 375/340–341
See application file for complete search history.

(56) References Cited

U.S. PATENT DOCUMENTS

| | | | | | |
|---|---|---|---|---|---|
| 4,493,048 | A | * | 1/1985 | Kung et al. | 708/607 |
| 4,727,503 | A | * | 2/1988 | McWhirter | 708/200 |
| 5,018,065 | A | * | 5/1991 | McWhirter et al. | 712/19 |
| 5,251,270 | A | | 10/1993 | Toyoda | |
| 5,475,793 | A | * | 12/1995 | Broomhead et al. | 706/14 |
| 5,717,621 | A | * | 2/1998 | Gupta et al. | 708/446 |
| 6,675,187 | B1 | * | 1/2004 | Greenberger | 708/622 |

(Continued)

FOREIGN PATENT DOCUMENTS

| | | |
|---|---|---|
| EP | 1 772 809 A2 | 4/2007 |
| EP | 1772809 A2 * | 4/2007 |

OTHER PUBLICATIONS

M. P. Fitton, S. Perry, and R. Jackson, "Reconfigurable Antenna Processing with Matrix Decomposition using FPGA based Application Specific Integrated Processors," in 2004 Software Defined Radio Technical Conference, 2004.*

(Continued)

Primary Examiner — Chuong D Ngo
Assistant Examiner — Matthew Sandifer
(74) Attorney, Agent, or Firm — Mauriel Kapouytian Woods LLP; Avarat Kapouytian

(57) ABSTRACT

A matrix decomposition circuit is described. In one implementation, the matrix decomposition circuit includes a processing element to process a plurality of processing cells and a scheduler coupled to the processing element, where the scheduler instructs the processing element to process only required processing cells of the plurality of processing cells. In one specific implementation, the required processing cells are processing cells with non-zero inputs. Also, in one specific implementation, the matrix decomposition circuit includes an internal memory that has a rotation angles memory that stores rotation angle values calculated by the processing element, where the rotation angles memory is a first-in first-out (FIFO) memory; a systolic cell internal input values memory that stores systolic cell internal input values, where the systolic cell internal input values memory is a FIFO memory; and a systolic cell values memory that stores systolic cell values, where the systolic cell values memory is an addressable memory. In one specific implementation, where a group of Mtotal input matrices are to be decomposed to Mtotal output matrices, where Mtotal is an integer greater than one, M input matrices are fed into a decomposition circuit to decompose in parallel, where M is an integer less than or equal to Mtotal and is a minimum number required to ensure that processing element latency is hidden.

19 Claims, 20 Drawing Sheets

(56) References Cited

U.S. PATENT DOCUMENTS

| | | | |
|---|---|---|---|
| 7,180,969 B1 | 2/2007 | Erving et al. | |
| 7,219,119 B2 | 5/2007 | Briemie et al. | |
| 7,366,326 B2 * | 4/2008 | Chang et al. | 382/107 |
| 7,492,844 B2 | 2/2009 | Kansanen et al. | |
| 7,716,454 B2 | 5/2010 | Fitton | |
| 7,933,353 B2 * | 4/2011 | Maltsev et al. | 375/267 |
| 2009/0116588 A1 * | 5/2009 | McNamara et al. | 375/340 |
| 2010/0086067 A1 * | 4/2010 | Oka | 375/260 |
| 2011/0125819 A1 * | 5/2011 | Mazahreh et al. | 708/207 |

OTHER PUBLICATIONS

J.H. Moreno, M.E. Figueroa, and T. Lang, "Linear pseudosystolic array for partitioned matrix algorithms," Journal of VLSI and Signal Processing, pp. 201-214, 1991.*

G.Lightbody, R.L.Walke, R.Woods, J.McCanny, "Novel mapping of a linear QR architecture", Proc. ICASSP, vol. IV, pp. 1933-1936, 1999.*

Oka, Naoto; Machine Translation of WO 2008/038626 A1, published Mar. 4, 2008.*

U.S. Appl. No. 12/072,144, Feb. 25, 2008, Dhanoa et al.

* cited by examiner

Update 0
Start Phase

Update 1
Start Phase

Update 2
Start Phase

Update 3
Start Phase

Update 4
End Phase

Update 5
End Phase

Update 6
End Phase

**Update 7
End Phase**

**Update 8
End Phase**

Update 9
End Phase

Update 10
End Phase

Update 0
Start Phase

Update 1
Start Phase

Update 2
Start Phase

Update 7
Middle Phase

Update 8
End Phase

HARDWARE ARCHITECTURE AND SCHEDULING FOR HIGH PERFORMANCE AND LOW RESOURCE SOLUTION FOR QR DECOMPOSITION

BACKGROUND

The present invention relates to matrix decomposition.

It is sometimes desirable to decompose a matrix A into other matrices. There are many types of matrix decomposition, an example of which is QR decomposition. In QR decomposition, a matrix A (or X) is decomposed into an orthogonal matrix Q and an upper triangular matrix R, i.e., a matrix where for each column, each element below the diagonal element of the column has a value equal to zero. Thus, a matrix A is replaced by the product of matrices Q and R. In other words, A is equal to the product QR.

QR decomposition may be applicable in a situation where a known matrix A is multiplied by a column vector V (whose elements are variables which need to be calculated) and results in a known column vector Z. In other words, AV=Z, where A is an N by N matrix, and V and Z are N by 1 matrices, i.e., column vectors, where N is an integer greater than Such matrices may be used, for example, to solve a set of simultaneous equations, a situation which arises in many applications (e.g., digital pre-distortion (DPD), Mutiple-Input and Multiple-Output (MIMO), beamforming, radar, and imaging). Replacing QR for A results in the following: QRV=Z, which can be transformed to RV=$Q^{-1}$Z. Q is known and, therefore, $Q^{-1}$ is also known. Similarly, as noted above, Z is also known. Therefore, the product $Q^{-1}$Z is also known and may be replaced by another known column vector Z'. Thus, RV=Z'. As both Z' and R are known, and R is an upper triangular matrix, the variable values for column vector V can be easily calculated using back substitution.

There are a number of known methods for performing the QR decomposition. These methods include the Gram-Schmidt transformation, the Householder transformation, and the Givens rotation. The Givens rotation may be implemented using a systolic array. In such an implementation, different columns of the input matrix A or X are fed into different columns of the systolic array while column matrix Z is fed into another column of the systolic array. The cells in the systolic array may include hardware for performing a coordinate rotation digital computer (CORDIC) algorithm to accomplish the Givens rotations needed for the QR decomposition.

It is desirable to efficiently implement hardware for performing matrix decomposition. Such efficiency may, for example, be achieved by increasing throughput and decreasing resource usage.

SUMMARY

In one aspect, an embodiment of the present invention provides a matrix decomposition circuit that includes a processing element (PE) to process a plurality of processing cells and a scheduler coupled to the PE, where the scheduler instructs the PE to process only required processing cells of the plurality of processing cells. In one embodiment, the required processing cells are processing cells with non-zero inputs. Processing only cells with non-zero inputs allows for improving throughput as PE resources are not wasted on processing cells with zero valued inputs.

Also, in one embodiment, the matrix decomposition circuit includes an internal memory that has a rotation angles memory that stores rotation angle values calculated by the PE, where the rotation angles memory is a first-in first-out (FIFO) memory; a systolic cell internal input values memory that stores systolic cell internal input values, where the systolic cell internal input values memory is a FIFO memory; and a systolic cell values memory that stores systolic cell values, where the systolic cell values memory is an addressable memory.

In one embodiment, where a group of Mtotal input matrices are to be decomposed to Mtotal output matrices, where Mtotal is an integer greater than one, M input matrices are fed into a decomposition circuit to decompose in parallel, where M is an integer less than or equal to Mtotal and is a minimum number required to ensure that PE latency is hidden. In cases where M is less than Mtotal, processing M matrices in parallel, rather than Mtotal matrices, allows for using a smaller internal memory.

BRIEF DESCRIPTION OF THE DRAWINGS

The novel features of the invention are set forth in the appended claims. However, for purpose of explanation, several aspects of particular embodiments of the invention are described by reference to the following figures.

DETAILED DESCRIPTION

The following description is presented to enable any person skilled in the art to make and use the invention, and is provided in the context of particular applications and their requirements. Various modifications to the exemplary embodiments will be readily apparent to those skilled in the art, and the generic principles defined herein may be applied to other embodiments and applications without departing from the spirit and scope of the invention. Thus, the present invention is not intended to be limited to the embodiments shown, but is to be accorded the widest scope consistent with the principles and features disclosed herein.

Figure 1:
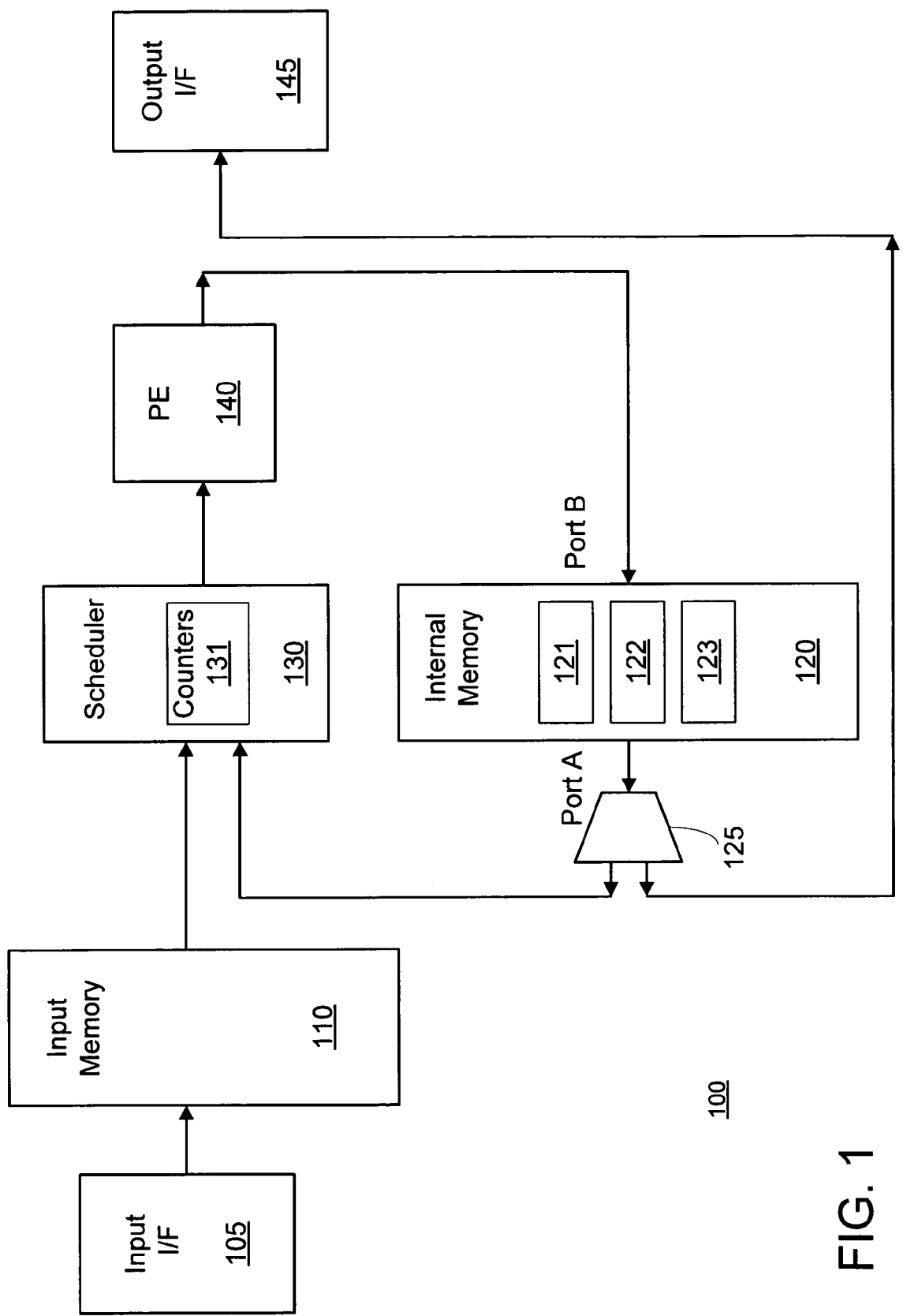
FIG. 1 is a block diagram of one embodiment of the matrix decomposition circuit of the present invention.

FIG. 1 is a block diagram of one embodiment of the matrix decomposition circuit of the present invention. In FIG. 1, matrix decomposition circuit 100 receives input data, i.e., elements of an input matrix (matrix A or X) and elements of a column vector (vector Z), via input interface (I/F) 105 and outputs output data, i.e., elements of an output matrix (e.g., matrix R as described above) and elements of a modified column vector (e.g., vector Z' as described above), via output I/F 145. The output data is herein also referred to as systolic cell values, as described below. In one embodiment, R is an upper triangular matrix. Input data received via input I/F 105 are stored in input memory 110. Similarly, output data, which are calculated by matrix decomposition circuit 100, more specifically by PE 140, are stored in internal memory 120. Internal memory 120 includes rotation angles memory 121 for storing rotation angles, systolic cell values memory 122 for storing systolic cell values, and systolic cell internal input values memory 123 for storing systolic cell internal input values. These memories and the values they store are discussed in more detail below. In one embodiment, internal memory 120 includes input memory 110. Scheduler 130, which includes counters 131, schedules the processing or calculation of the output data. Counters 131 maintain counter values used by scheduler 130 in scheduling the processing or calculation of the output data. This is discussed in greater detail below. Demultiplexer 125 receives data read via port A of internal memory 120 and selects between forwarding that data to scheduler 130 and output I/F 145.

In one embodiment, matrix decomposition circuit 100 generally operates as follows. Input data are written into input memory 110 by way of input I/F 105. Thereafter, scheduler 130 reads required data from input memory 110 and internal memory 120. The required data are data required for calculating intermediate data or output data. The required data may include any combination of input data and intermediate data. As used herein intermediate data refers to data which is calculated using any combination of input data, and other intermediate data and which is itself used for calculating other intermediate data or output data. As used herein intermediate data refers to rotation angle values, the systolic cell internal input values, and initial and updated estimates of the systolic cell values (excluding the systolic cell value), as described below. The scheduler 130 forwards the required data and control information to PE 140. In one embodiment, the control information includes phase information, reset information, what data to write back to internal memory 120, and where to write data back in internal memory 120. The control information is described in greater detail below. PE 140 calculates output data and intermediate data and writes its calculation results to internal memory 120 via port B. In one embodiment, as internal memory 120 is a dual port memory, scheduler 130 may read data from internal memory 120 via port A while PE 140 writes data to internal memory 120 via port B. Elements of the output matrix are read out of internal memory 120 via port A and are sent to output I/F 145 by way of demultiplexer 135. As port A of memory 120 is shared amongst scheduler 130 and output I/F 145, in one embodiment, scheduler 130 and output I/F 145 cannot access memory 120 at the same time. In one embodiment, scheduler 130 controls the reading of data from internal memory 120 for both the decomposition process (i.e., calculating output data) and the process of outputting output data from matrix decomposition circuit 100.

In one embodiment, PE 140 can apply backpressure to scheduler 130 to indicate that it cannot accept more data. This would allow scheduler 130 to operate without knowledge of PE 140's data input rate requirement. In another embodiment, the data input rate requirement of PE 140 may be fixed. As such, scheduler 130 would feed data to PE 140 at a rate corresponding to the data input rate requirement of PE 140, e.g., once every C cycles, where C is an integer greater than or equal to 1. In one embodiment, C is a synthesis time parameter. In another embodiment, C may be defined at other times. In one embodiment, scheduler 130 is designed to be able to feed data into PE 140 once every clock cycle (i.e., C is equal to 1). Also in one embodiment, scheduler 130 can also operate without knowledge of the processing delays of PE 140. In such an embodiment, scheduler 130 interrogates internal memory 120 to determine if required data is available in internal memory 120.

It is to be noted that in matrix decomposition circuit 100, the scheduling of operations (which is performed by scheduler 130) is separated from the actual processing of data (which is performed PE 140). In one embodiment, a user may design its own PE (e.g., one using floating point implementation of Givens rotations) and include that PE into the framework of the matrix decomposition circuit.

As can be seen in FIG. 1, matrix decomposition circuit 100 includes one scheduler and one PE. Such a single PE design has the advantage of simple scheduling regardless of the size of the input matrix. In another embodiment, a matrix decomposition circuit may include one scheduler and multiple PEs whose processing is controlled by the scheduler. Such a multiple PE design involves more complicated scheduling for dealing with multiple PEs and possibly different input matrix sizes. In one embodiment, such complication may involve use of a look up table (LUT) by the scheduler to detail the scheduling for each PE. Such a multiple PE design may have higher throughput than a single PE design, but not necessarily by the same multiple as the number of PEs.

As noted above, in one embodiment, the output matrix is an upper triangular matrix. For each column of the output matrix, elements below the diagonal element are zero elements and have a value equal to zero. The remaining elements of the output matrix are non-zero elements. As used herein, non-zero elements of the output matrix refers to the diagonal elements and elements above the diagonal elements of the output matrix. It is to be noted that some of these elements may have values equal to zero. Thus, non-zero elements refer not to the value of the elements but to their position within the matrix.

Figure 2:
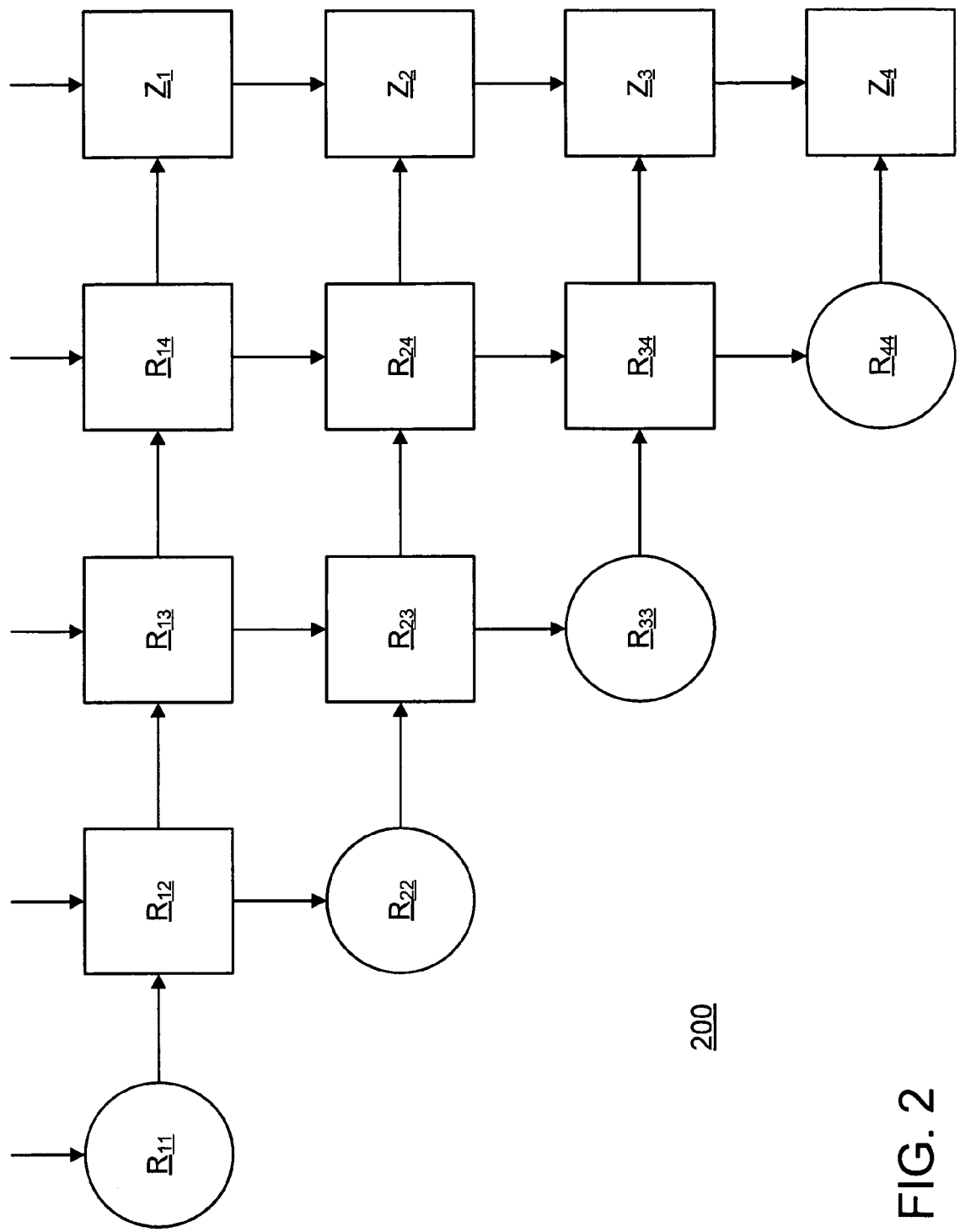
FIG. 2 illustrates an example of a systolic array that may be implemented by a processing element of the present invention.

In one embodiment, PE 140 may implement a systolic array with a plurality of cells. FIG. 2 illustrates an example of a systolic array that may be implemented by a PE of the present invention. In FIG. 2, systolic array 200 includes boundary cells $R_{11}$, $R_{22}$, $R_{33}$, and $R_{44}$ and internal cell $R_{12}$, $R_{13}$, $R_{14}$, $R_{23}$, $R_{24}$, $R_{34}$, $Z_1$, $Z_2$, $Z_3$, and $Z_4$. Boundary cells $R_{11}$, $R_{22}$, $R_{33}$, and $R_{44}$ respectively calculate the diagonal elements $r_{11}$, $r_{22}$, $r_{33}$, and $r_{44}$ of matrix R. Internal cells $R_{12}$, $R_{13}$, $R_{14}$, $R_{23}$, $R_{24}$, and $R_{34}$ respectively calculate the non-diagonal elements $r_{12}$, $r_{13}$, $r_{14}$, $r_{23}$, $r_{24}$, and $r_{34}$ of matrix R. Internal cells $Z_1$, $Z_2$, $Z_3$, and $Z_4$ respectively calculate elements $z'_1$, $z'_2$, $z'_3$, and $z'_4$ of modified vector Z' discussed in the Background section above. It is to be noted that PE 140 does not necessarily include cells physically arranged as shown in systolic array 200. Instead, it may include one or more cells that collectively function as a systolic array. Thus, rather than illustrating the physical arrangement of cells, FIG. 2 is intended to illustrate the order in which the cells are processed, the source of data used by each cell, and the sink of data calculated by each cell. As explained below, in one embodiment, the data does not directly flow from one cell to another. Instead, the data calculated by one cell may be sent to internal memory 120 before it is sent to cells adjacent to the one cell.

In one embodiment, for each update, cells in the systolic array are processed in order, starting from the boundary cell in the first row, continuing with the rest of the cells in the first row from left to right, moving to each of the other rows in order from the second row down to the last row, and for each row after the first row, following the same order of processing as in the first row. For example, for each update, in systolic array 200, cells are processed in the following order: $R_{11}$, $R_{12}$, $R_{13}$, $R_{14}$, $Z_1$, $R_{22}$, $R_{23}$, $R_{24}$, $Z_2$, $R_{33}$, $R_{34}$, $Z_3$, $R_{44}$, and $Z_4$. As noted below, for many updates, some, but not all, cells are processed. In such a case, for the cells that are processed, the processing order is as described above. In one embodiment, cells $R_{11}$, $R_{12}$, $R_{13}$, $R_{14}$, $Z_1$, $R_{22}$, $R_{23}$, $R_{24}$, $Z_2$, $R_{33}$, $R_{34}$, $Z_3$, $R_{44}$, and $Z_4$ are numbered 0-13, respectively, which reflects the order of their processing.

Systolic array 200 is for processing a 4 by 4 input matrix and a 4 by 1 column vector to provide a 4 by 4 output matrix and a 4 by 1 modified column vector. Those skilled in the art would appreciate that the size of systolic array 200 may be varied to process matrices and vectors other than 4 by 4 matrices and 4 by 1 vectors. In general, the total number of cells Ncells in a systolic array is given by the following equation:

$$Ncells = N*(N+3)/2, \quad \text{Equation 1}$$

where N is an integer that represents the number of columns in the input matrix. If the input matrix is a square matrix, then N also represents the number of rows in the input matrix. Additionally, N represents the number of variables or coefficients to be calculated. N may also herein be referred to as the input matrix order. In the example of systolic array 200, N is equal to 4, and Ncells is equal to 14.

Figure 3:
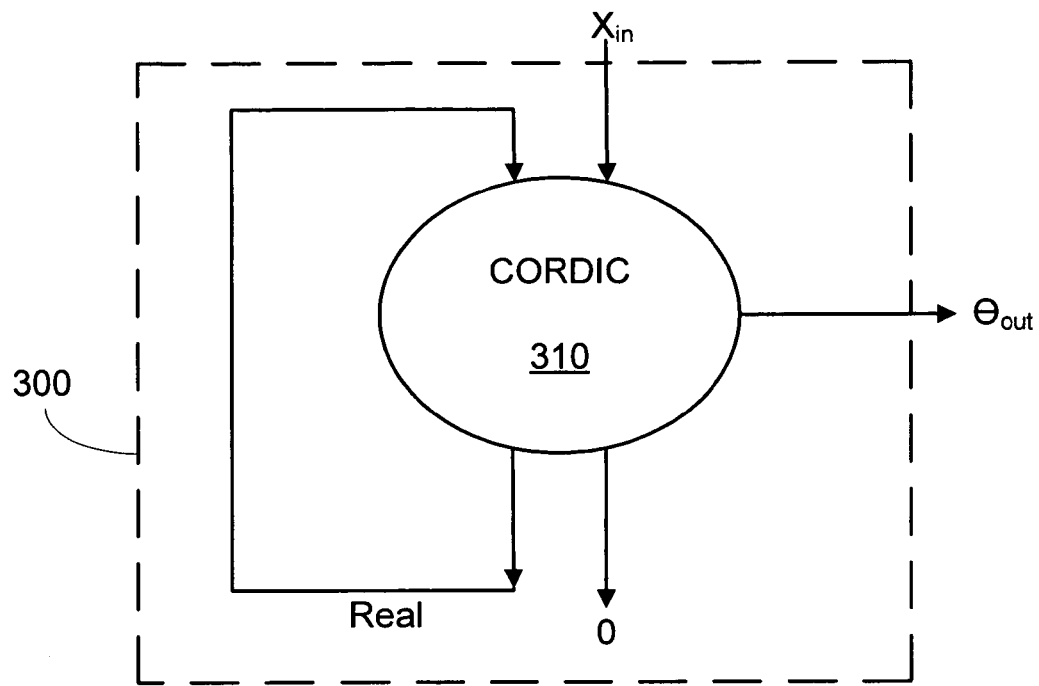
FIG. 3 illustrates an example of a boundary cell of the systolic array of FIG. 2.

In one embodiment, the processing in each of the cells in systolic array 200 is achieved by performing a CORDIC algorithm to accomplish the Givens rotations needed for QR decomposition. FIG. 3 illustrates an example of a boundary cell of the systolic array of FIG. 2. In FIG. 3, boundary cell 300 includes a CORDIC 310. Boundary cell 300 uses CORDIC 310 in vectorize mode to determine the phase $\theta_{out}$ of the vector (Real, $X_{in}$), where $X_{in}$ is the input into boundary cell 300. The phase $\theta_{out}$ determined by boundary cell 300 is then applied to other cells in the same row as boundary cell 300. As angle $\theta_{out}$ is the phase of vector (Real, $X_{in}$), rotating the vector (Real, $X_{in}$) by angle $\theta_{out}$ clockwise produces a vector ($Real_o$, 0).

Figure 4:
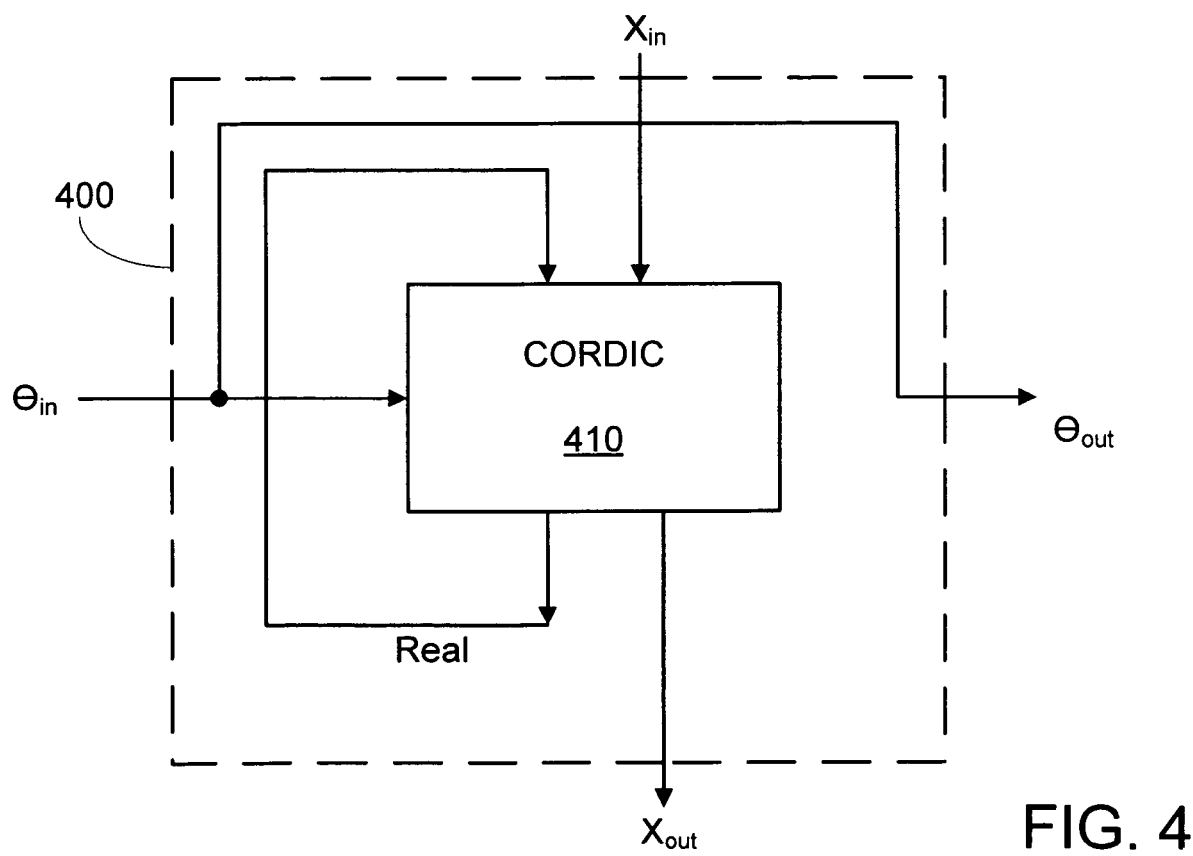
FIG. 4 illustrates an example of an internal cell of the systolic array of FIG. 2.

FIG. 4 illustrates an example of an internal cell of the systolic array of FIG. 2. In FIG. 4, internal cell 400 includes CORDIC 410. Internal cell 400 uses CORDIC 410 in rotate mode to rotate an input vector (Real, $X_{in}$) by the angle $\theta_{in}$ (calculated by the boundary cell of the row of internal cell 400). If the rotated vector is represented by ($Real_o$, $X_{out}$), then $Real_o$ is used as the new Real value for that cell and $X_{out}$ is output from internal cell 400 and fed into the cell immediately below internal cell 400 in the systolic array. Internal cell 400 receives $X_{in}$ and $\theta_{in}$ as inputs and provides $X_{out}$ and $\theta_{out}$ as outputs. It is to be noted that, in the embodiment shown in FIG. 4, $\theta_{out}$ is equal to $\theta_{in}$. As such, all internal cells on a row of the systolic array use the same rotation angle $\theta_{in}$ determined by the boundary cell of that row.

Figure 5:
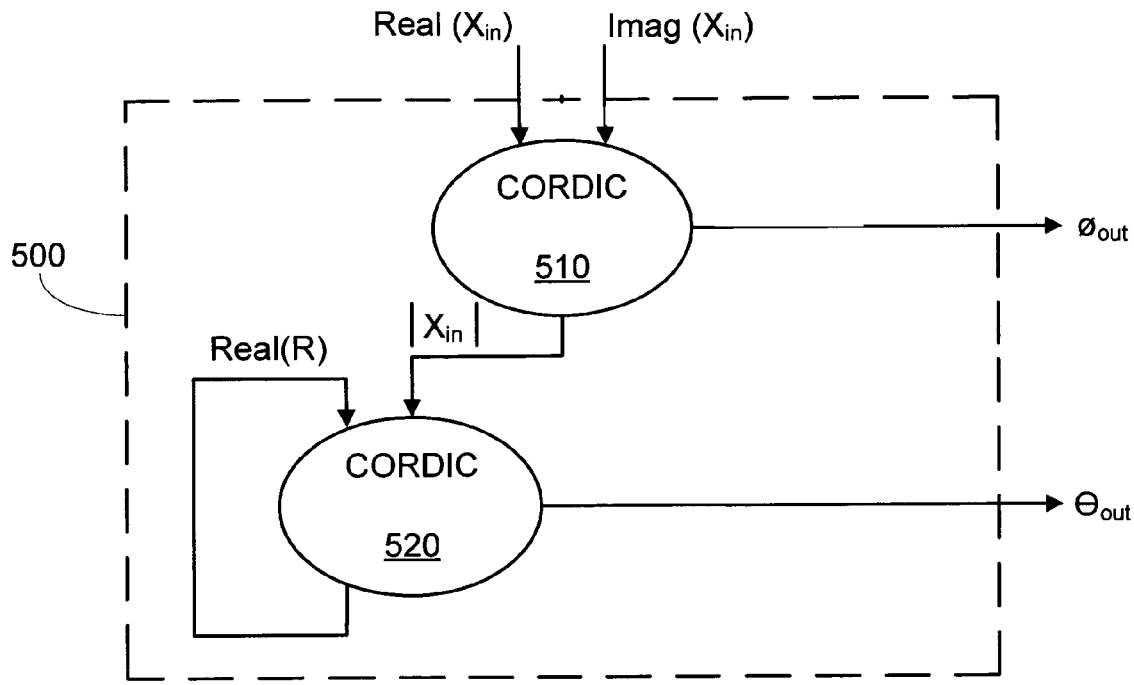
FIG. 5 illustrates an example of a boundary cell of the systolic array of FIG. 2 for the case when the data is complex valued.

FIG. 5 illustrates an example of a boundary cell of the systolic array of FIG. 2 for the case when the data is complex valued. In FIG. 5, boundary cell 500 includes CORDICs 510 and 520 and operates in vectorize mode to determine rotation angles for the real and imaginary component of a complex input number $X_{in}$. CORDIC 510, which operates in vectorize mode, receives Real($X_{in}$) and Imag($X_{in}$), the real and imaginary components, respectively, of a complex number $X_{in}$, and provides $\varnothing_{out}$ and the magnitude of $X_{in}$ as outputs. The value of $\varnothing_{out}$ is provided as an output of boundary cell 500, whereas the magnitude of $X_{in}$ is provided as an input to CORDIC 520. CORDIC 520, which also operates in vectorize mode, receives the magnitude of $X_{in}$ as an input and provides $\theta_{out}$ as an output of boundary cell 500.

Figure 6:
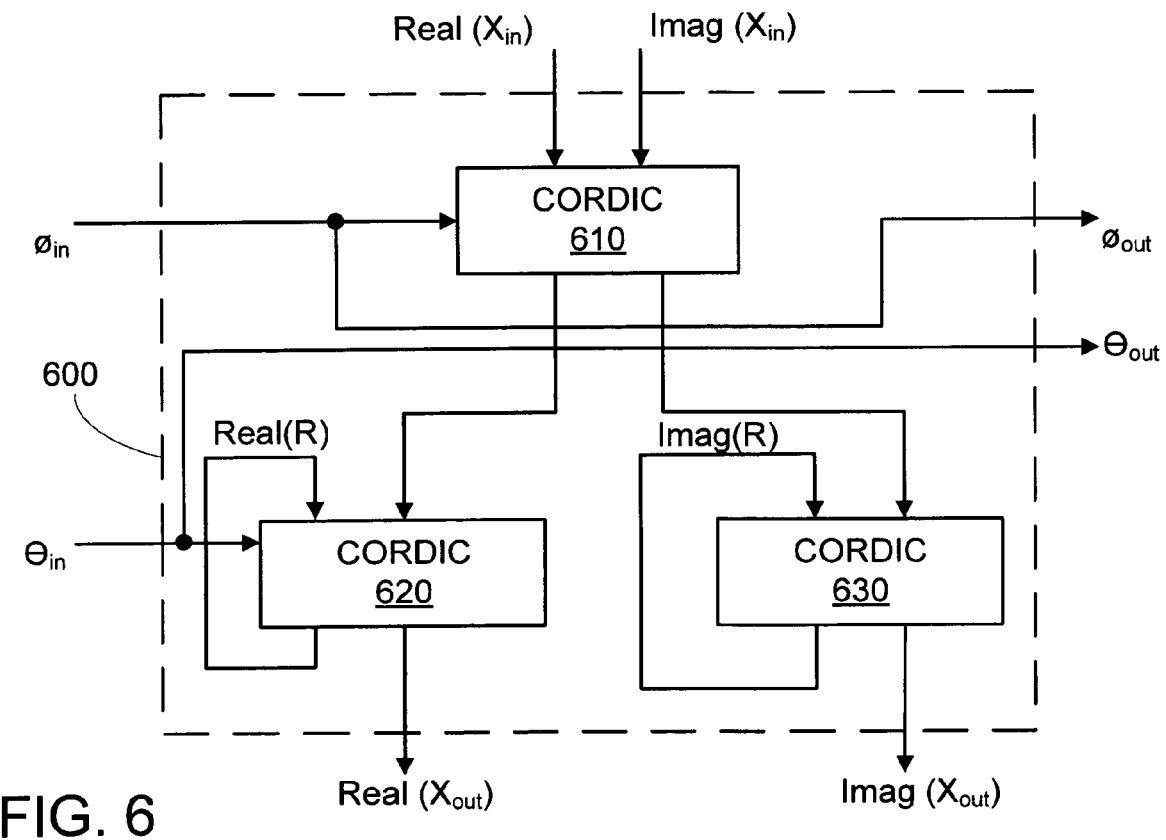
FIG. 6 illustrates an example of an internal cell of the systolic array of FIG. 2 for the case when the data is complex valued.

FIG. 6 illustrates an example of an internal cell of the systolic array of FIG. 2 for the case when the data is complex valued. In FIG. 6, internal cell 600 includes CORDICs 610, 620, and 630 and operates in rotate mode. Internal cell 600 receives Real($X_{in}$) and Imag($X_{in}$), the real and imaginary components, respectively, of a complex number $X_{in}$ from either a cell immediately above internal cell 600 or as an element of an input matrix. Internal cell 600 also receives $\varnothing_{in}$ and $\theta_{in}$ from the cell immediately to the left of internal cell 600, which may be a boundary cell such as boundary cell 500 or some other internal cell similar to internal cell 600. In response, internal cell provides $\varnothing_{out}$, $\theta_{out}$, Real($X_{out}$), and Imag($X_{out}$) as outputs, where Real($X_{out}$) and Imag($X_{out}$) are respectively the real and imaginary components of a complex number $X_{out}$. The values of $\varnothing_{out}$ and $\theta_{out}$ are provided as inputs to a cell immediately to the right of internal cell 600, whereas the values of Real($X_{out}$) and Imag($X_{out}$) are provided to the cell immediately below internal cell 600. It is to be noted that, in the embodiment shown in FIG. 6, $\theta_{out}$ and $\varnothing_{out}$ are respectively equal to $\theta_{in}$ and $\varnothing_{in}$. As such, all internal cells on a row of the systolic array use the same rotation angles $\theta_{in}$ and $\varnothing_{in}$ determined by the boundary cell of that row. In one embodiment, internal cell 600 may be modified such that it includes only two, rather than three, instances of physical CORDICs. In such a case, internal cell 600 would be able to accept new data once every two clock cycles. On the other hand, with three instances of physical CORDICs, internal cell 600 is capable of accepting new data once every clock cycle.

It is to be noted that boundary cell 300 and internal cell 400 are for processing real values $X_{in}$. On the other hand, boundary cell 500 and internal cell 600 can process both real and complex values $X_{in}$.

In one embodiment, CORDICs used in boundary cells 300 and 500 and internal cells 400 and 600 use Altera® Corporation's CORDIC reference design to perform Givens rotations. It is to be noted that other CORDIC designs may also be used to perform Givens rotations. In one embodiment, a user can specify, at synthesis time, the CORDIC bit widths required for performing Givens rotations. In one embodiment, CORDICs used in PE 140 are designed for processing 16 bit complex data. In another embodiment, a floating point implementation of Givens rotation may be used in PE 140. It is to be noted that, in one embodiment, scheduler 130 is agnostic as to whether PE 140 is processing complex or real numbers.

Figure 7A:
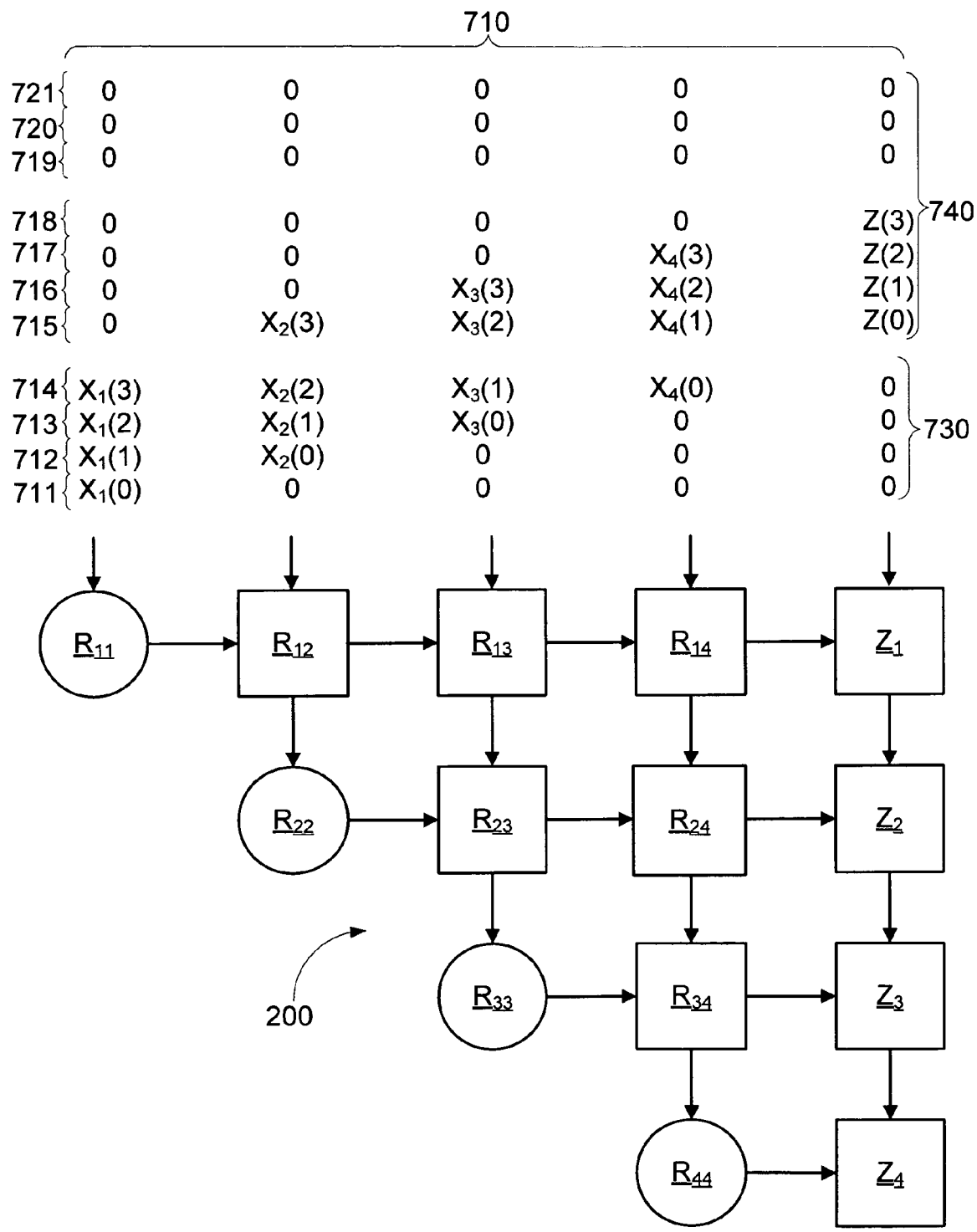
FIG. 7A illustrates an exemplary application of data to a systolic array according to an embodiment of the present invention.

FIG. 7A illustrates an exemplary application of data to a systolic array according to an embodiment of the present invention. In FIG. 7A, systolic array 200 receives data 710 for processing. Systolic array 200 is described above in relation to FIG. 2. Data 710 includes elements of an input matrix X and elements of an input column vector Z. The elements of the input matrix X include $X_1(0)$, $X_1(1)$, $X_1(2)$, $X_3(3)$, $X_2(0)$, $X_2(1)$, $X_2(2)$, $X_2(3)$, $X_3(0)$, $X_3(1)$, $X_3(2)$, $X_3(3)$, $X_4(0)$, $X_4(1)$, $X_4(2)$, and $X_4(3)$. The elements of the column vector Z include $Z(0)$, $Z(1)$, $Z(2)$, and $Z(3)$. The elements of the input matrix X and column vector Z are input into the systolic array 200 in a staggered fashion as shown in FIG. 7A.

In FIG. 7A, rows 711 to 721 respectively include the data input into systolic array 200 on updates 0 to 10. For each update, a row of data is fed into systolic array 200, cells in systolic array 200 receiving data (either from other cells in systolic array 200 or from outside systolic array 200) process the data they receive, and cell values for cells receiving data are updated. It may take cells more than one clock cycle to process the data for an update. As a result, processing of an update may require multiple clock cycles. Rows 711 to 714 are received in start phase 730, whereas rows 715 to 721 are received in end phase 740. In FIG. 7A, systolic array 200 performs a non-recursive QR decomposition, e.g., QRD (QR Decomposition). As such, the processing includes only a start phase and an end phase, but not a middle phase.

In one embodiment, for each update, only the required cells of the systolic array are processed, i.e., only cells that need to be processed for that update are actually processed. In one embodiment, for each update, only cells that have non-zero input data are processed. As used herein non-zero input data refers to data whose value may be a non-zero value given its location in the staggered data input into the systolic array, i.e., data indicated by any of the following $X_1(0)$ to $X_1(3)$, $X_2(0)$ to $X_2(3)$, $X_3(0)$ to $X_3(3)$, $X_4(0)$ to $X_4(3)$, $Z(0)$ to $Z(3)$ in FIG. 7A. Non-zero input data also includes data received directly or indirectly from other systolic cells. This data includes rotation angle values and systolic cell internal input values. It is to be noted that a non-zero input data may have a value of zero. Zero valued data are those data whose value is necessarily zero given their location in the staggered data input into the systolic array, i.e., those data indicated by 0 in FIG. 7A. In one embodiment, zero valued data are not provided to PE 140. FIGS. 7B-L illustrate which cell(s) in the systolic array are processed at updates 0 to 10, respectively, of FIG. 7A. In FIGS. 7B-L, the number to the right of each cell represents the address of that cell's r or z' value in internal memory 120, more specifically, it represents the systolic cell address of that cell in systolic cell values memory 122.

Figure 7B:
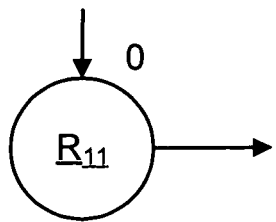
FIGS. 7B-L illustrate which cell(s) in the systolic array are processed at the various updates of FIG. 7A.

As shown in FIG. 7B, for update 0, only cell $R_{11}$ is processed, which receive data $X_1(0)$. As cell $R_{11}$ is a boundary cell it operates in vectorize mode to generate a rotation angle $\theta_{11}(0)$. Cell $R_{11}$ also generates a value $r_{11}(0)$ representing an initial estimate of element $r_{11}$ of output matrix R.

Figure 7C:
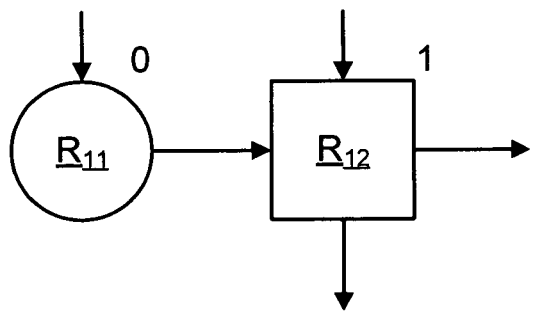

For update 1, as illustrated in FIG. 7C, only cells $R_{11}$ and $R_{12}$ are processed. Cell $R_{11}$ receives data $X_1(1)$ and generates a rotation angle $\theta_{11}(1)$. Using $r_{11}(0)$, cell $R_{11}$ also generates a value $r_{11}(1)$ representing an updated estimate value for element $r_{11}$. Cell $R_{12}$ receives data $X_2(0)$ from the input matrix X and rotation angle $\theta_{11}(0)$ from cell $R_{11}$. As cell $R_{12}$ is an internal cell, it operates in rotate mode to generate $X_{12}(0)$ which it provides to cell $R_{22}$ and rotate angle $\theta_{12}(0)$ which it provides to cell $R_{13}$. Cell $R_{12}$ also generates a value $r_{12}(0)$ representing an initial estimate of element $r_{12}$ of output matrix R.

Figure 7D:
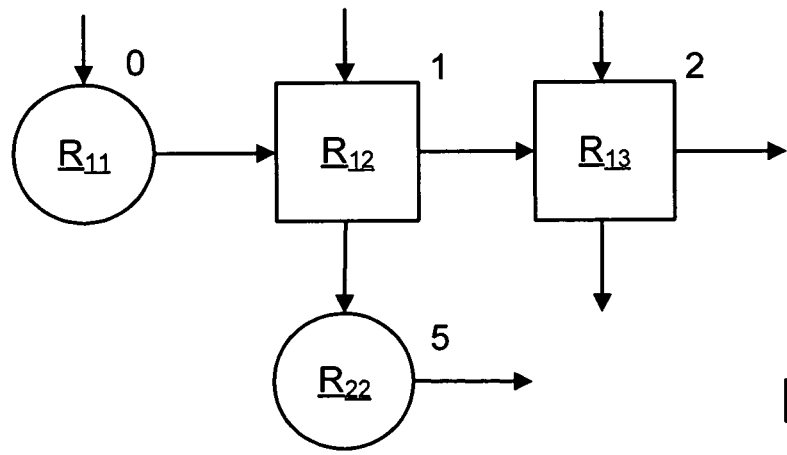

For update 2, as illustrated in FIG. 7D, only cells $R_{11}$, $R_{12}$, $R_{13}$ and $R_{22}$ are processed. Cell $R_{11}$ receives data $X_1(2)$ and generates a rotation angle $\theta_{11}(2)$. Using $r_{11}(1)$, cell $R_{11}$ also generates a value $r_{11}(2)$ representing another updated estimate value for element $r_{11}$. Cell $R_{12}$ receives data $X_2(1)$ from the input matrix X and rotation angle $\theta_{11}(1)$ from cell $R_{11}$. As cell $R_{12}$ is an internal cell, it operates in rotate mode to generate $X_{12}(1)$ which it provides to cell $R_{22}$ and rotation angle $\theta_{12}(1)$ which it provides to cell $R_{13}$. Cell $R_{12}$ also generates a value $r_{12}(1)$ representing an updated estimate of element $r_{12}$. Cell $R_{13}$ receives data $X_3(0)$ from the input matrix X and rotation angle $\theta_{12}(0)$ from cell $R_{12}$. As cell $R_{13}$ is an internal cell, it operates in rotate mode to generate $X_{13}(0)$ which it provides to cell $R_{23}$ and rotation angle $\theta_{13}(0)$ which it provides to cell $R_{14}$. Cell $R_{13}$ also generates a value $r_{13}(0)$ representing an initial estimate of element $r_{13}$ of output matrix R. Cell $R_{22}$ receives data $X_{12}(0)$ from cell $R_{12}$ and generates a rotation angle $\theta_{22}(0)$, which it provides to cell $R_{23}$. Cell $R_{22}$ also generates a value $r_{22}(0)$ representing an initial estimate of element $r_{22}$ of output matrix R.

Figure 7E:
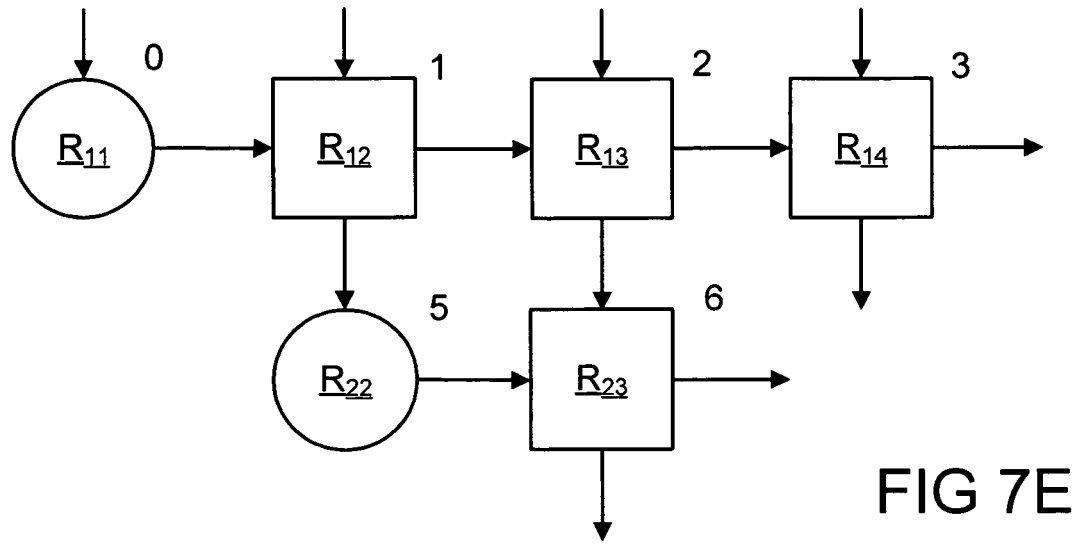

For update 3, as illustrated in FIG. 7E, only cells $R_{11}$, $R_{12}$, $R_{13}$, $R_{14}$, $R_{22}$, and $R_{23}$ are processed. Cell $R_{11}$ receives data $X_1(3)$ and generates a rotation angle $\theta_{11}(3)$. Using $r_{11}(2)$, cell $R_{11}$ also generates a value $r_{11}(3)$, which is equal to $r_{11}$. Once cell $R_{11}$ calculates $r_{11}$, it stops processing data for the matrix. Thus, in the next update, cell $R_{11}$ no longer processes data. Cell $R_{12}$ receives data $X_2(2)$ from the input matrix X and rotation angle $\theta_{11}(2)$ from cell $R_{11}$. As cell $R_{12}$ is an internal cell, it operates in rotate mode to generate $X_{12}(2)$ which it provides to cell $R_{22}$ and rotation angle $\theta_{12}(2)$ which it provides to cell $R_{13}$. Cell $R_{12}$ also generates a value $r_{12}(2)$ representing another updated estimate of element $r_{12}$. Cell $R_{13}$ receives data $X_3(1)$ from the input matrix X and rotation angle $\theta_{12}(1)$ from cell $R_{12}$. As cell $R_{13}$ is an internal cell, it operates in rotate mode to generate $X_{13}(1)$ which it provides to cell $R_{23}$ and rotation angle $\theta_{13}(1)$ which it provides to cell $R_{14}$. Cell $R_{13}$ also generates a value $r_{13}(1)$ representing an updated estimate of element $r_{13}$. Cell $R_{22}$ receives data $X_{12}(1)$ from cell $R_{12}$ and generates a rotation angle $\theta_{22}(1)$, which it provides to cell $R_{23}$. Cell $R_{22}$ also generates a value $r_{22}(1)$ representing an updated estimate of element $r_{22}$ of output matrix R. Cell $R_{14}$ receives data $X_4(0)$ from the input matrix X and rotation angle $\theta_{13}(0)$ from cell $R_{13}$. As cell $R_{14}$ is an internal cell, it operates in rotate mode to generate $X_{14}(0)$ which it provides to cell $R_{24}$ and rotation angle $\theta_{14}(0)$ which it provides to cell $Z_1$. Cell $R_{14}$ also generates a value $r_{14}(0)$ representing an initial estimate of element $r_{14}$ of output matrix R. Cell $R_{23}$ receives data $X_{13}(0)$ from cell $R_{13}$ and rotation angle $\theta_{22}(0)$ from cell $R_{22}$. As cell $R_{23}$ is an internal cell, it operates in rotate mode to generate $X_{23}(0)$ which it provides to cell $R_{33}$ and rotation angle $\theta_{23}(0)$ which it provides to cell $R_{24}$. Cell $R_{23}$ also generates a value $r_{23}(0)$ representing an initial estimate of element $r_{23}$ of output matrix R.

Figure 7F:
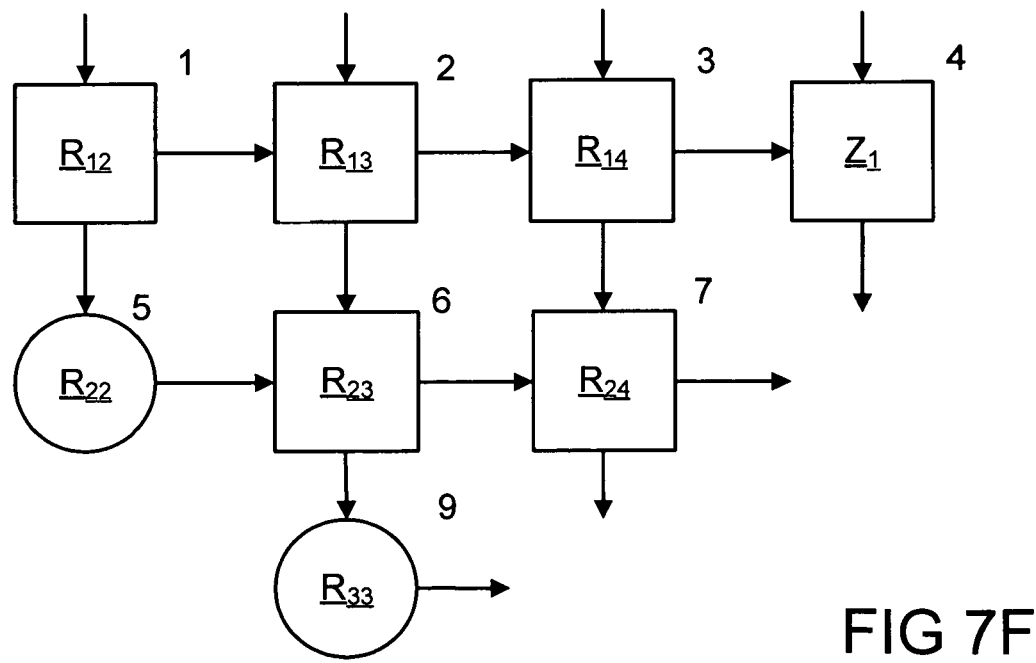
Figure 7G:
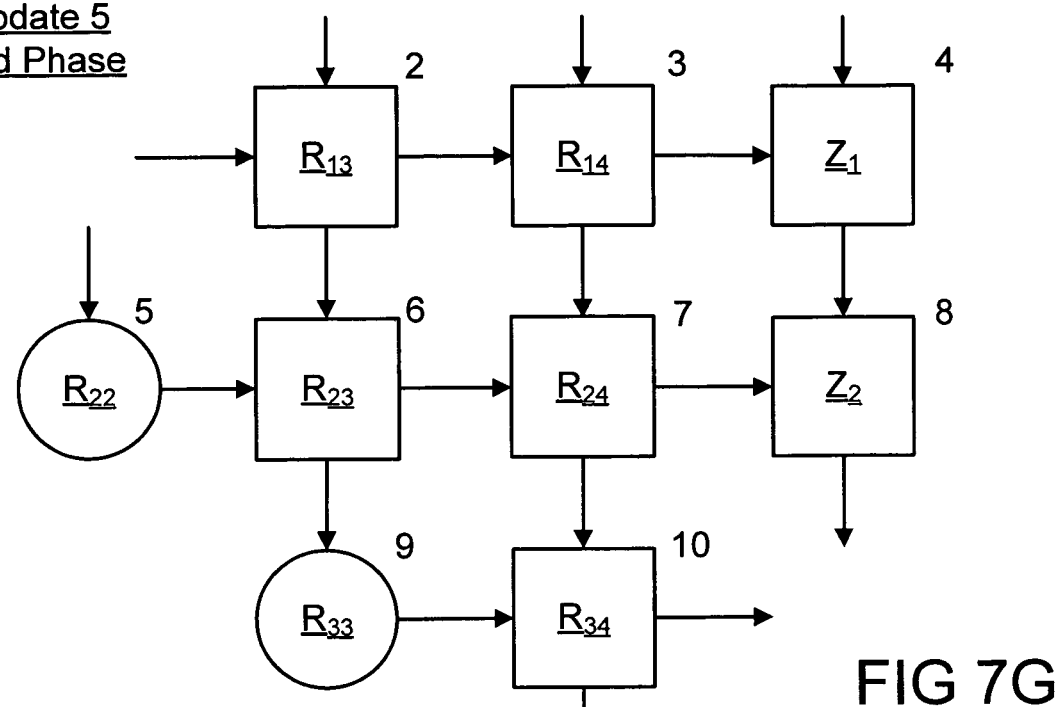
Figure 7H:
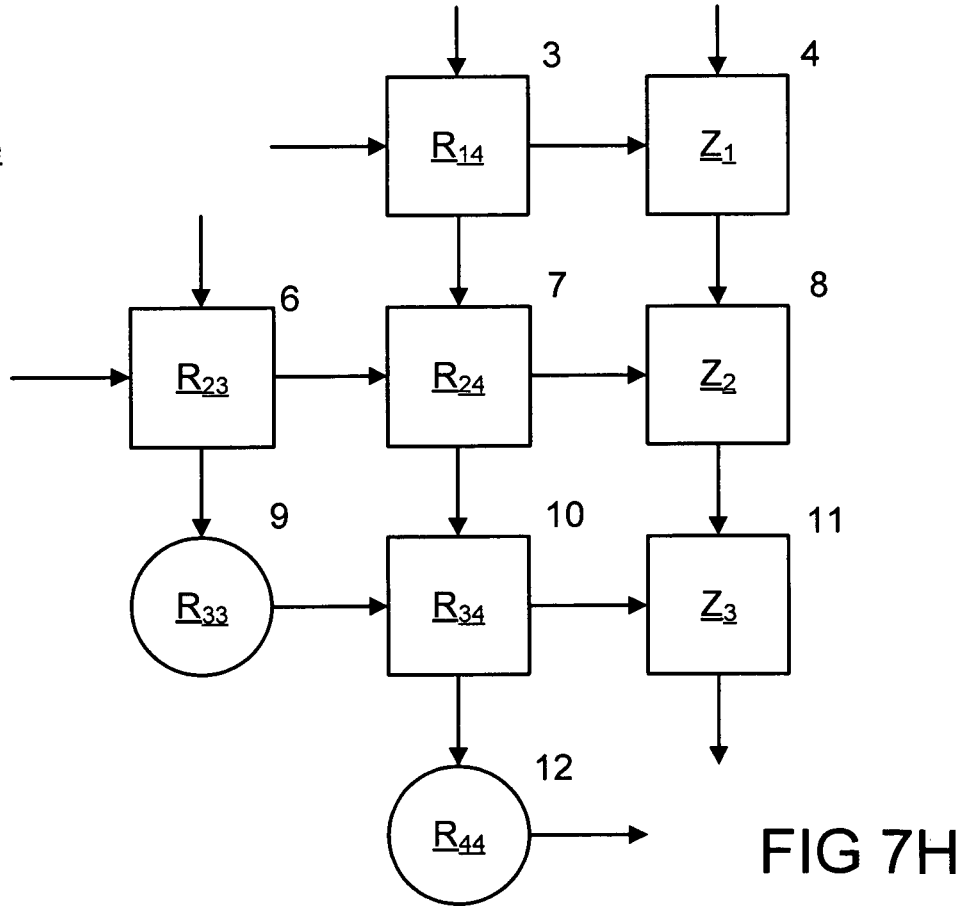
Figure 7I:
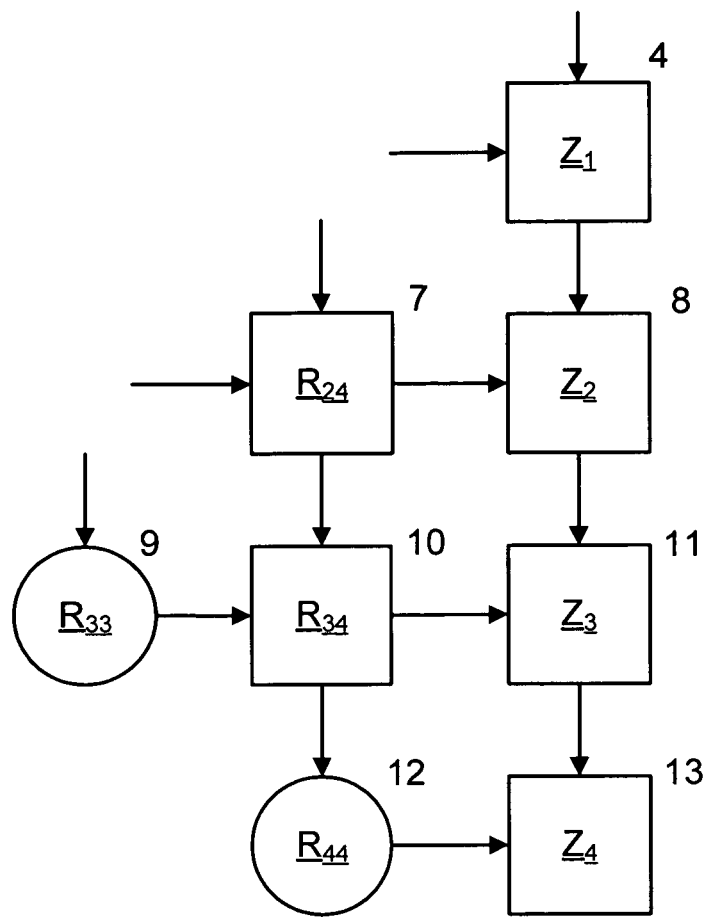
Figure 7J:
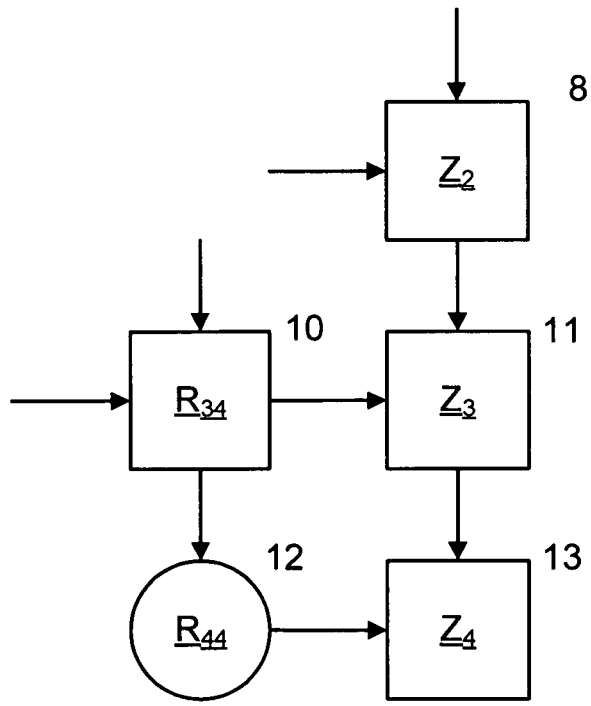
Figure 7K:
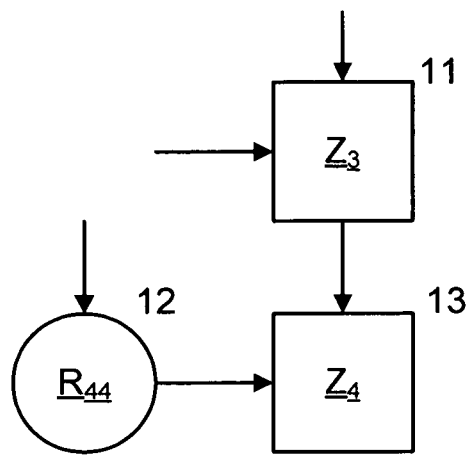
Figure 7L:
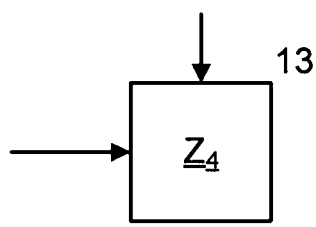

For update 4, as illustrated in FIG. 7F, only cells $R_{12}$, $R_{13}$, $R_{14}$, $R_{22}$, $R_{23}$, $R_{24}$, $R_{33}$, and $Z_1$ are processed. As noted above, cell $R_{11}$ is no longer processing new data as it calculated element $r_{11}$. Cell $R_{12}$ receives data $X_2(3)$ from the input matrix X and rotation angle $\theta_{11}(3)$ from cell $R_{11}$. As cell $R_{12}$ is an internal cell, it operates in rotate mode to generate $X_{12}(3)$ which it provides to cell $R_{22}$ and rotation angle $\theta_{12}(3)$ which it provides to cell $R_{13}$. Cell $R_{12}$ also generates a value $r_{12}(3)$, which is equal to element $r_{12}$. Cell $R_{13}$ receives data $X_3(2)$ from the input matrix X and rotation angle $\theta_{12}(2)$ from cell $R_{12}$. As cell $R_{13}$ is an internal cell, it operates in rotate mode to generate $X_{13}(2)$ which it provides to cell $R_{23}$ and rotation angle $\theta_{13}(2)$ which it provides to cell $R_{14}$. Cell $R_{13}$ also generates a value $r_{13}(2)$ representing an updated estimate of element $r_{13}$. Cell $R_{22}$ receives data $X_{12}(2)$ from cell $R_{12}$ and generates a rotation angle $\theta_{22}(2)$, which it provides to cell $R_{23}$. Cell $R_{22}$ also generates a value $r_{22}(2)$ representing another updated estimate of element $r_{22}$. Cell $R_{14}$ receives data $X_4(1)$ from the input matrix X and rotation angle $\theta_{13}(1)$ from cell $R_{13}$. As cell $R_{14}$ is an internal cell, it operates in rotate mode to generate $X_{14}(1)$ which it provides to cell $R_{24}$ and rotation angle $\theta_{14}(1)$ which it provides to cell $Z_1$. Cell $R_{14}$ also generates a value $r_{14}(1)$ representing an updated estimate of element $r_{14}$. Cell $R_{23}$ receives data $X_{13}(1)$ from cell $R_{13}$ and rotation angle $\theta_{22}(1)$ from cell $R_{22}$. As cell $R_{23}$ is an internal cell, it operates in rotate mode to generate $X_{23}(1)$ which it provides to cell $R_{33}$ and rotation angle $\theta_{23}(1)$ which it provides to cell $R_{24}$. Cell $R_{23}$ also generates a value $r_{23}(1)$ representing an updated estimate of element $r_{23}$. Cell $R_{24}$ receives data $X_{14}(0)$ from cell $R_{14}$ and rotation angle $\theta_{23}(0)$ from cell $R_{23}$. As cell $R_{24}$ is an internal cell, it operates in rotate mode to generate $X_{24}(0)$ which it provides to cell $R_{34}$ and rotation angle $\theta_{24}(0)$ which it provides to cell $Z_2$. Cell $R_{24}$ also generates a value $r_{24}(0)$ representing an initial estimate of element $r_{24}$. Cell $R_{33}$ receives data $X_{23}(0)$ from cell $R_{23}$ and generates a rotation angle $\theta_{33}(0)$, which it provides to cell $R_{34}$. Cell $R_{33}$ also generates a value $r_{33}(0)$ representing an initial estimate of element $r_{33}$. Cell $Z_1$ receives data $Z(0)$ from output vector Z and rotation angle $\theta_{14}(0)$ from cell $R_{14}$. Cell $Z_1$ generates $Z_1(0)$ which it provides to cell $Z_2$ and a value $z'_1(0)$ representing an initial estimate of element $z'_1$, the element in the first row of modified column vector Z', which may also herein be referred to as output column vector Z'.

The process continues in a similar manner for the remaining updates. It is to be noted that, for each update, each of the cells that is processed generates either an initial estimate, an update of the estimate or a final value for the element of the output matrix R or output vector matrix Z' which it is responsible for calculating.

In FIGS. 7B-L, the 11 updates above involve processing 56 cells. Without the optimizations of processing only cells with non-zero input data, the 11 updates would have involved processing 11*14=154 cells. Thus, a potential improvement of over 60% exists. It is to be noted that this assumes there are enough matrices to decompose in parallel to hide the PE latency.

Figure 8A:
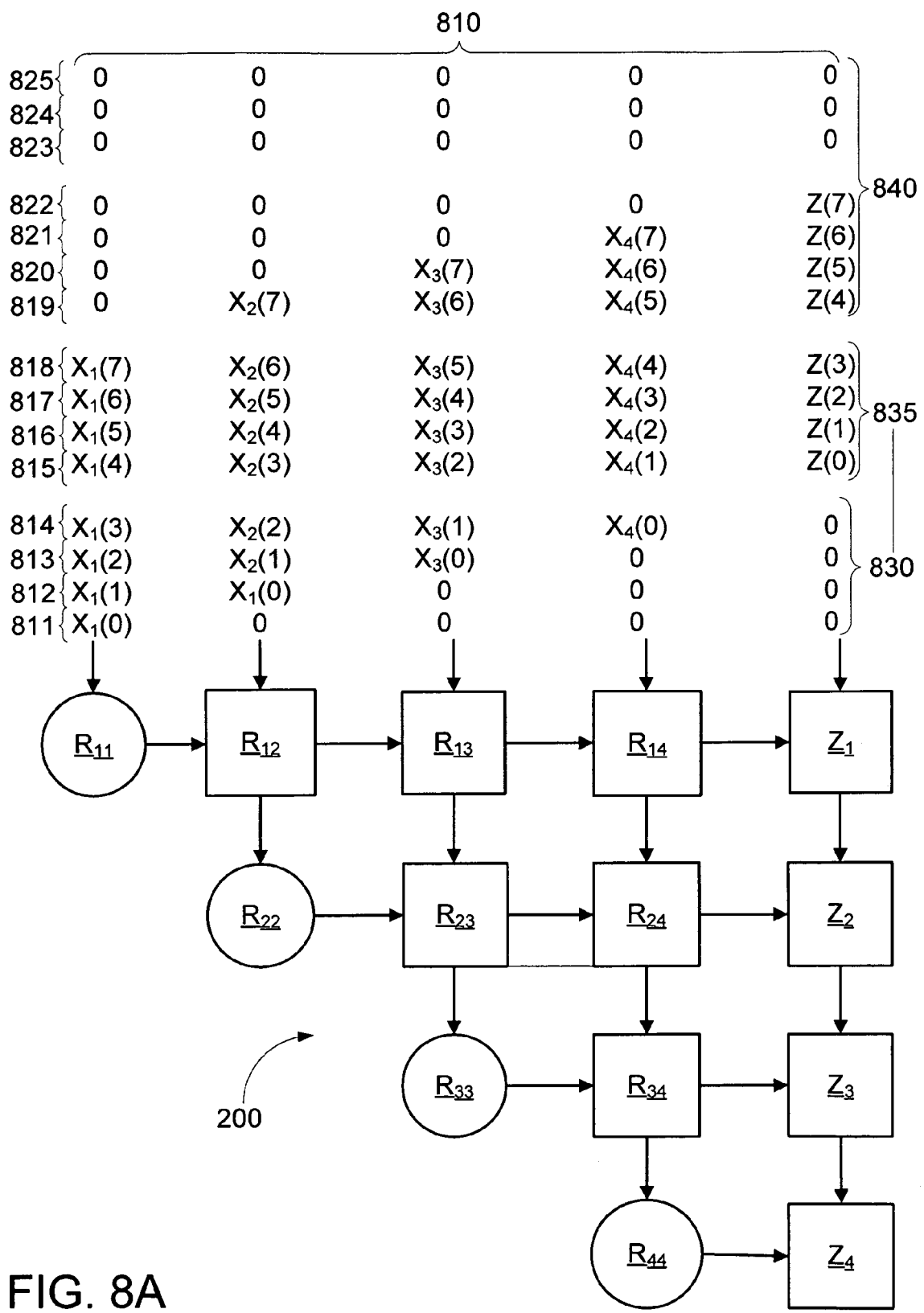
FIG. 8A illustrates another exemplary application of data to a systolic array according to an embodiment of the present invention.

FIG. 8A illustrates another exemplary application of data to a systolic array according to an embodiment of the present invention. In FIG. 8A, systolic array 200 receives data 810 for processing. Systolic array 200 is described above in relation to FIG. 2. Data 810 includes elements of an input matrix X and elements of an input column vector Z. The elements of the input matrix X include $X_1(0)$ to $X_1(7)$, $X_2(0)$ to $X_2(7)$, $X_3(0)$ to $X_3(7)$, and $X_4(0)$ to $X_4(7)$. The elements of column vector Z include $Z(0)$ to $Z(7)$. The elements of the input matrix X and column vector Z are input into the systolic array 200 in a staggered fashion as shown in FIG. 8A.

In FIG. 8A, rows 811 to 825 respectively include the data input into systolic array 200 on updates 0 to 14. Rows 811 to 814 are received in start phase 830, whereas rows 815 to 818 are received in middle phase 835, and rows 819 to 825 are received in end phase 840. In FIG. 8A, systolic array 200 performs a recursive QR decomposition, e.g., QRD-RLS (QRD-Recursive Least Squares). As such, the processing includes a start phase, a middle phase, and an end phase. The length of the middle phase depends on the number of recursive stages in the QRD-RLS decomposition algorithm. In FIG. 8A, middle phase 835 includes 4 updates. However, the middle phase may include any number of updates, including thousands of updates. It is to be noted that the inclusion of middle phase 835 with the resulting addition of iterations improves the results produced for the calculated elements, i.e., it provides a better estimate for variables calculated using results of the QR decomposition.

Figure 8B:
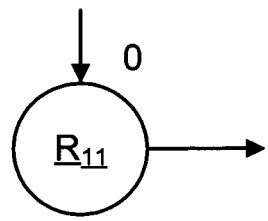
FIGS. 8B-P illustrate which cell(s) in the systolic array are processed at the various updates of FIG. 8A.
Figure 8C:
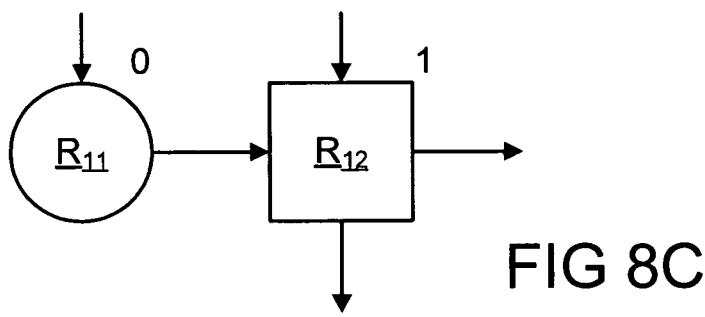
Figure 8D:
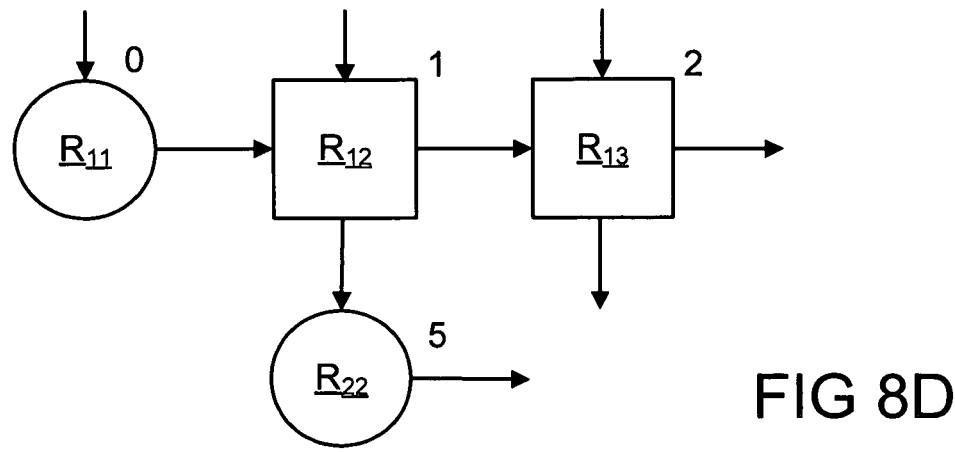
Figure 8E:
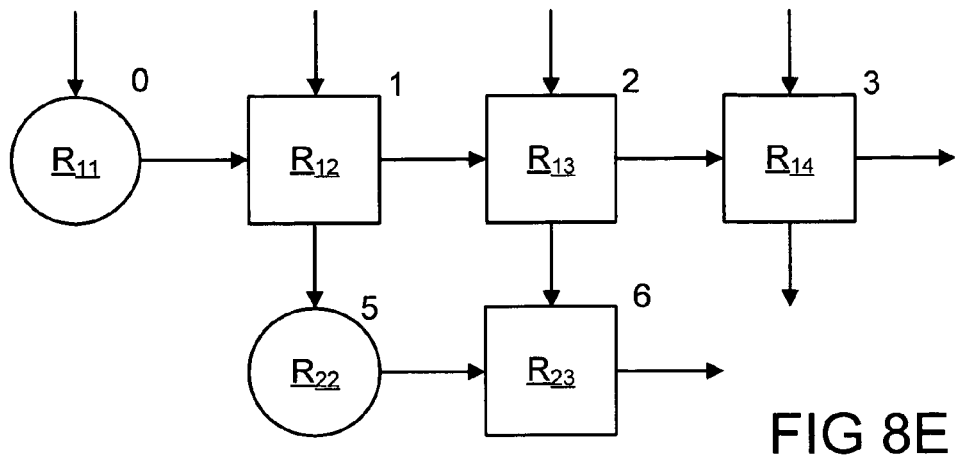
Figure 8F:
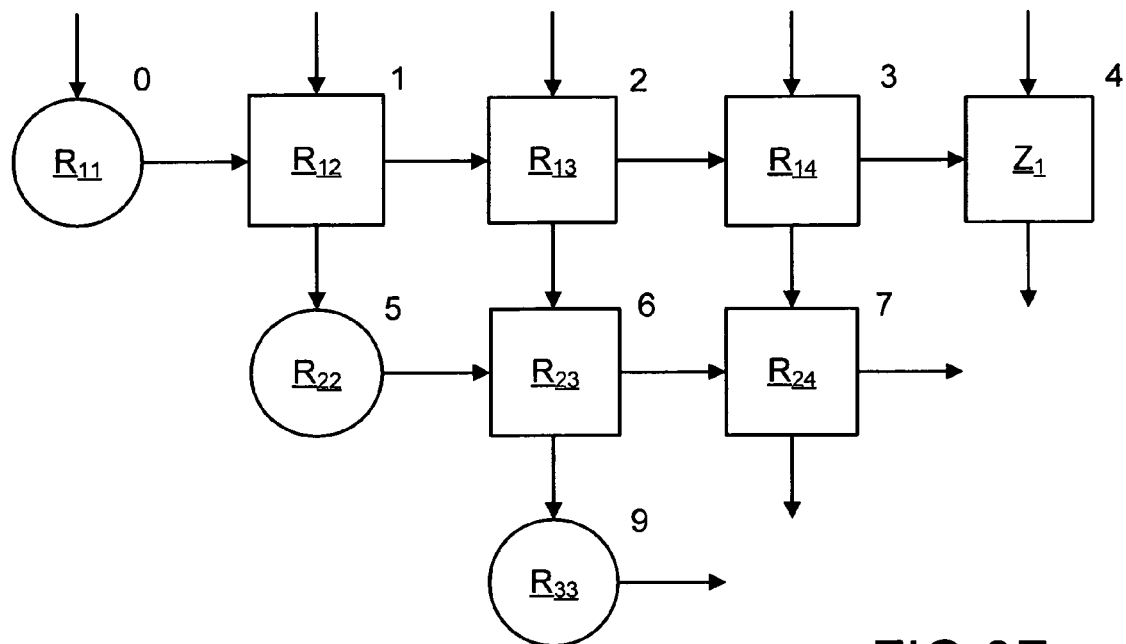
Figure 8G:
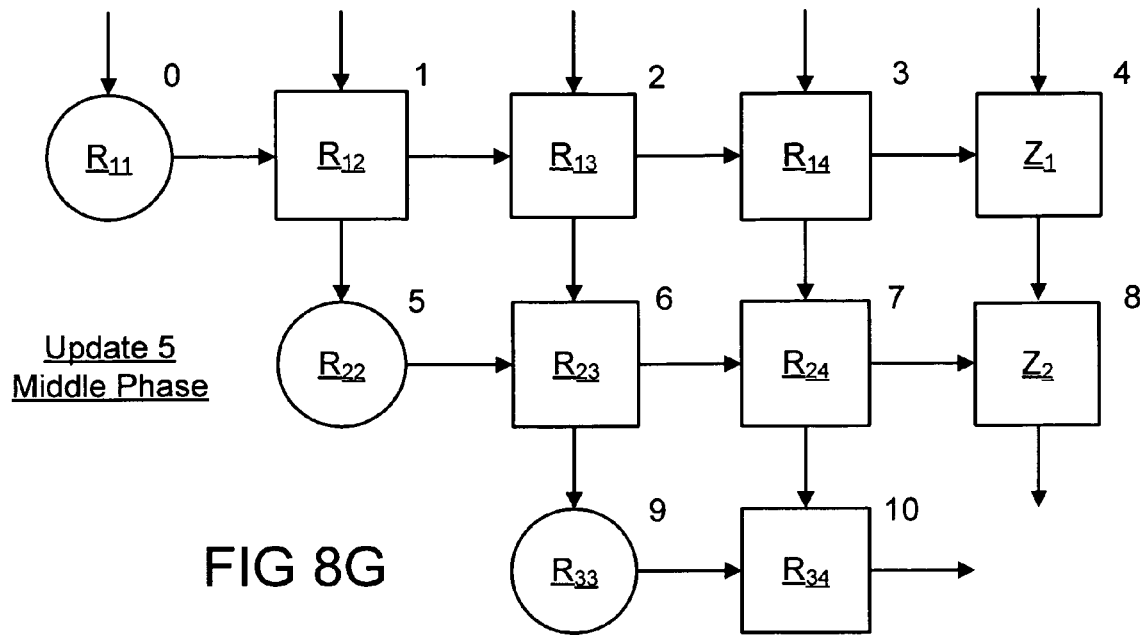
Figure 8H:
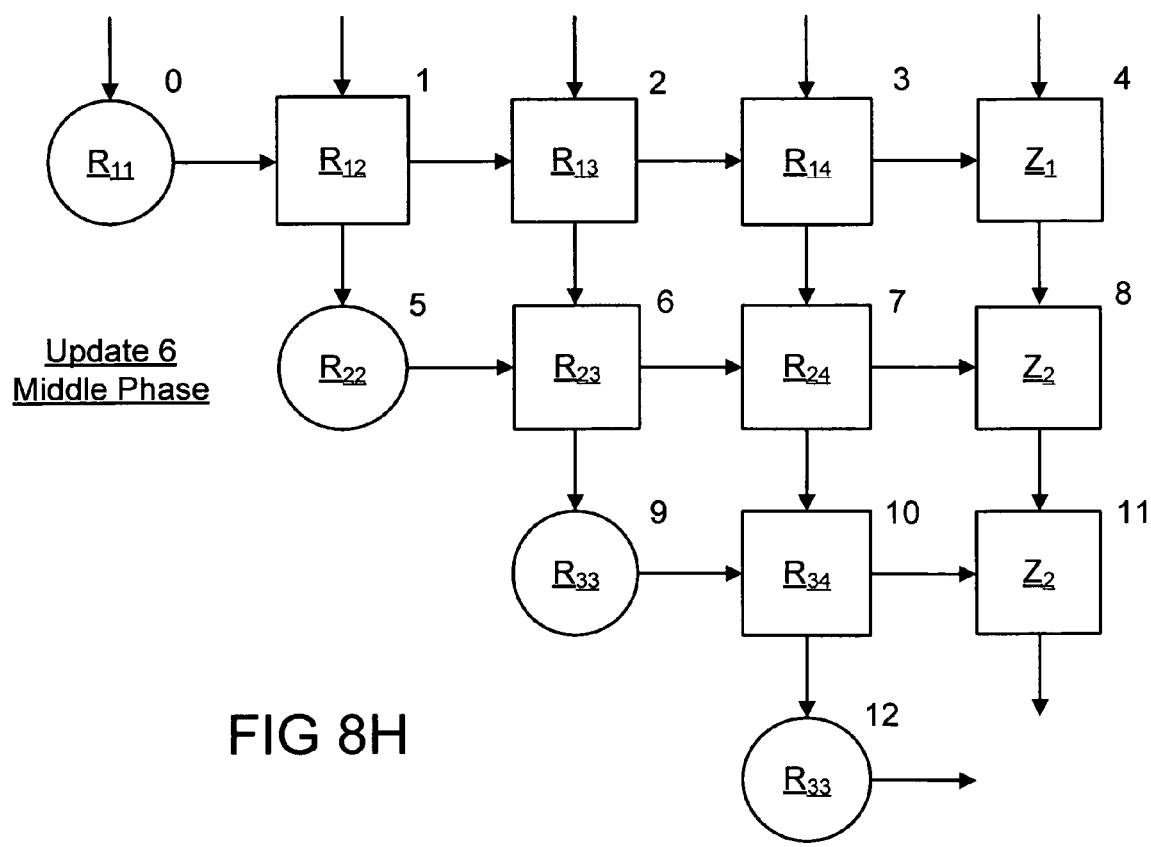
Figure 8I:
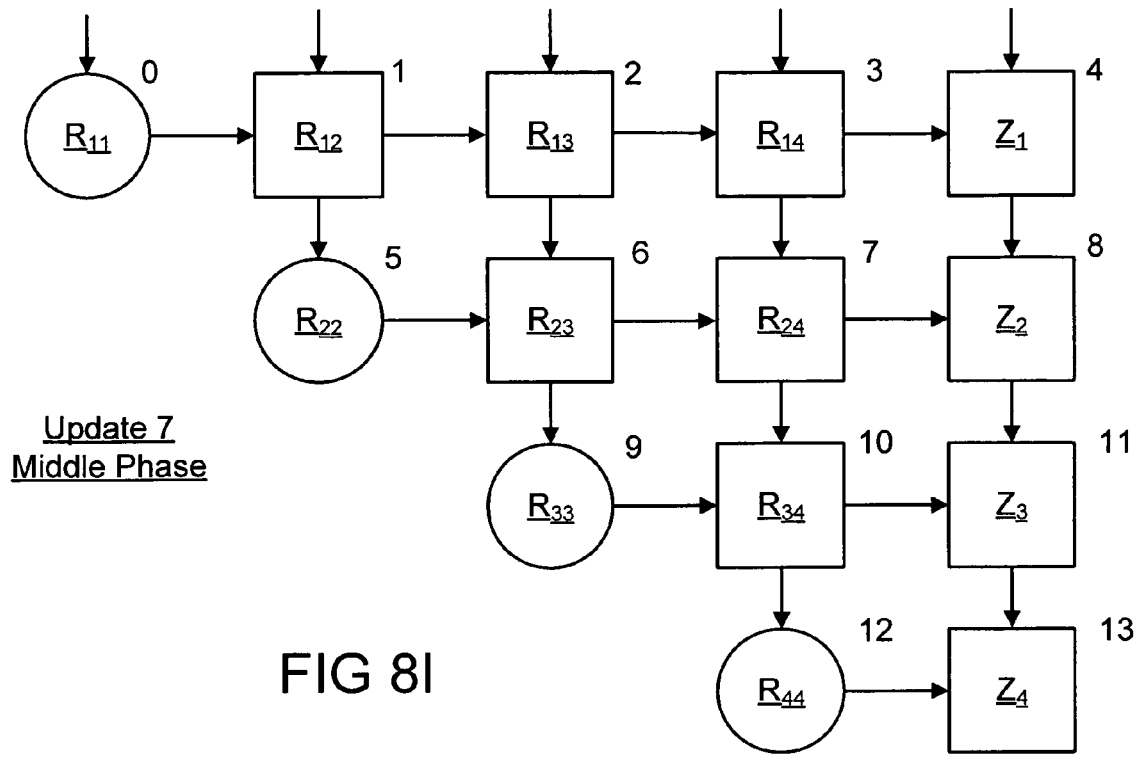
Figure 8J:
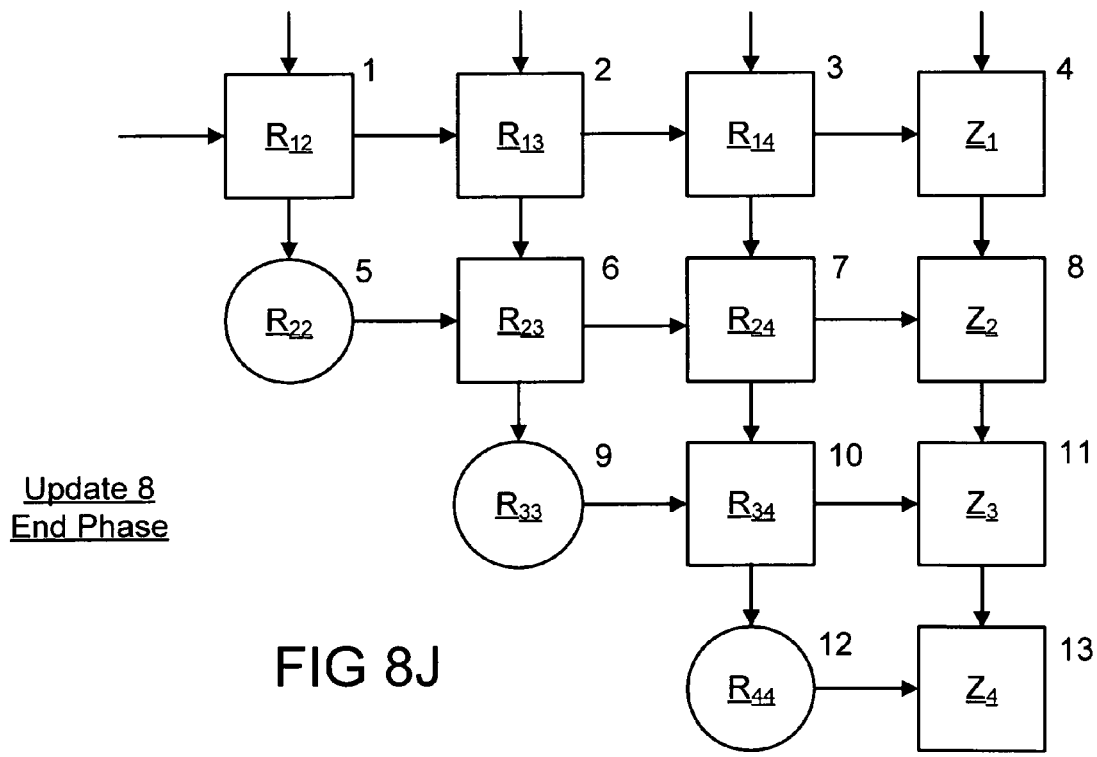
Figure 8K:
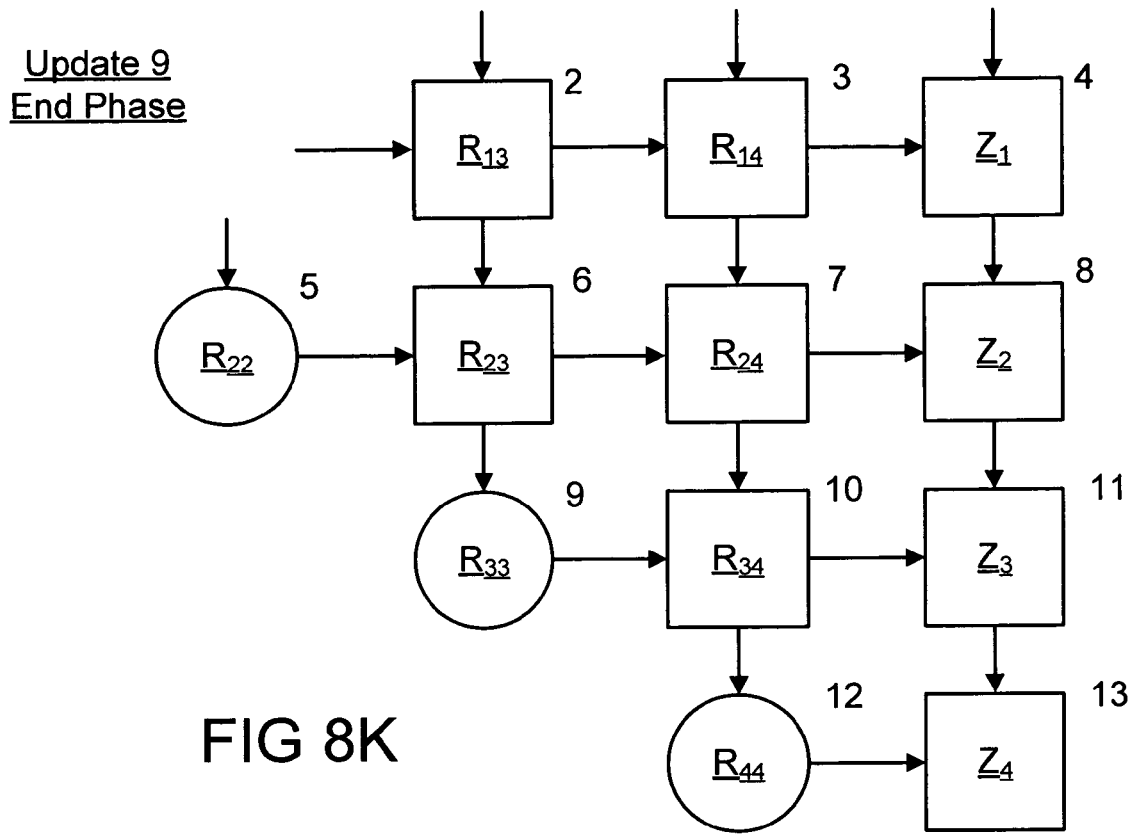
Figure 8L:
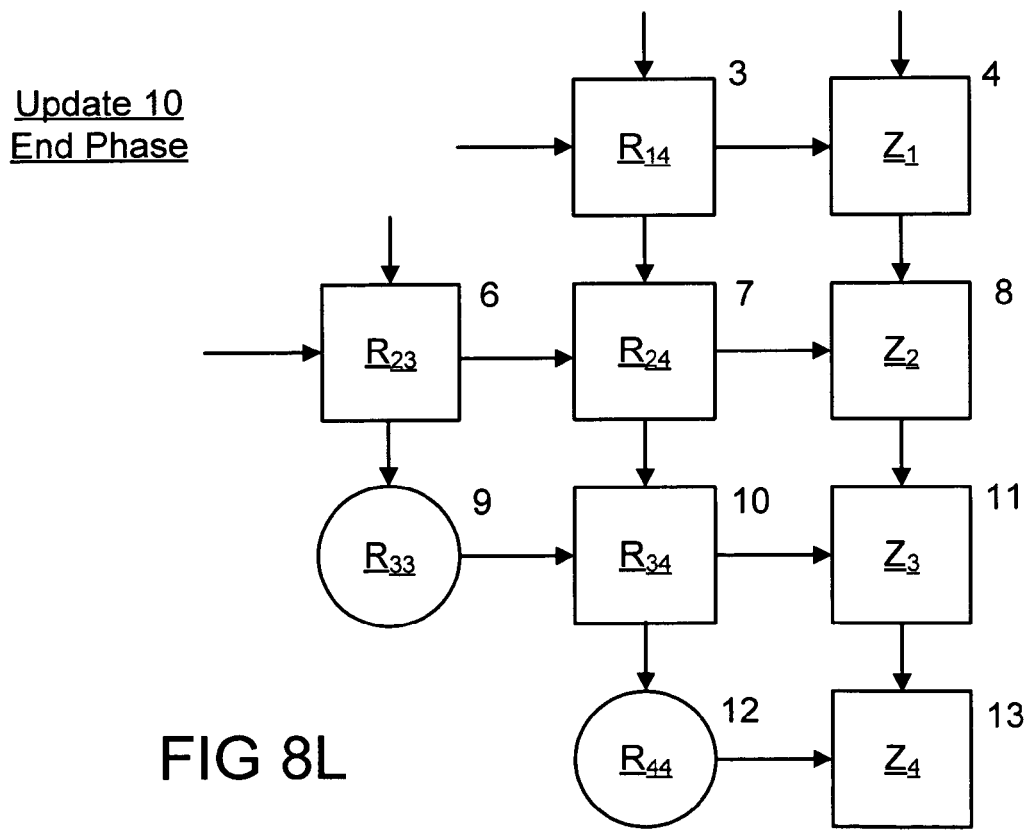
Figure 8M:
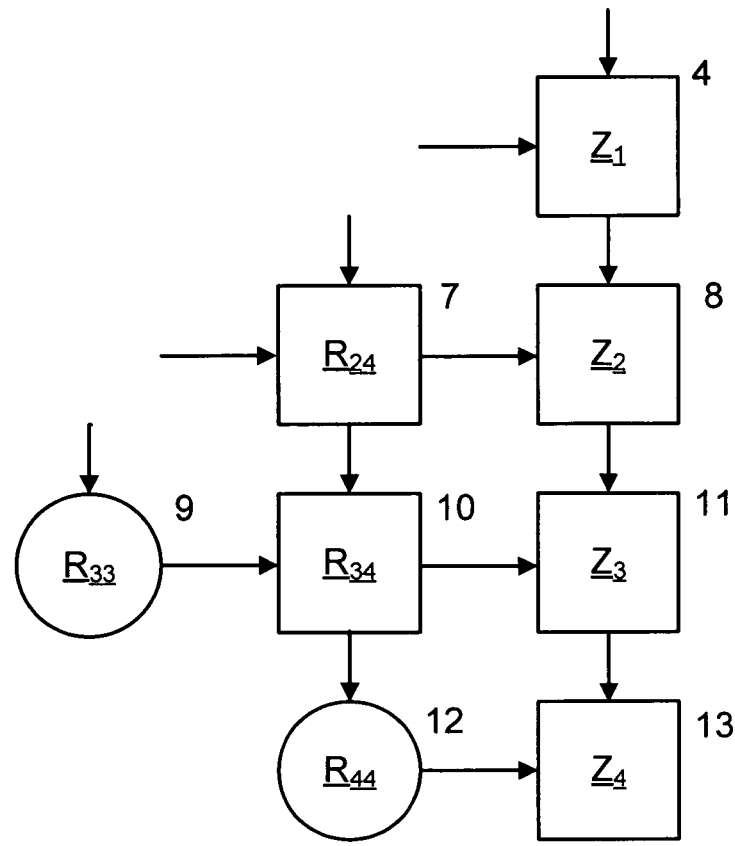
Figure 8N:
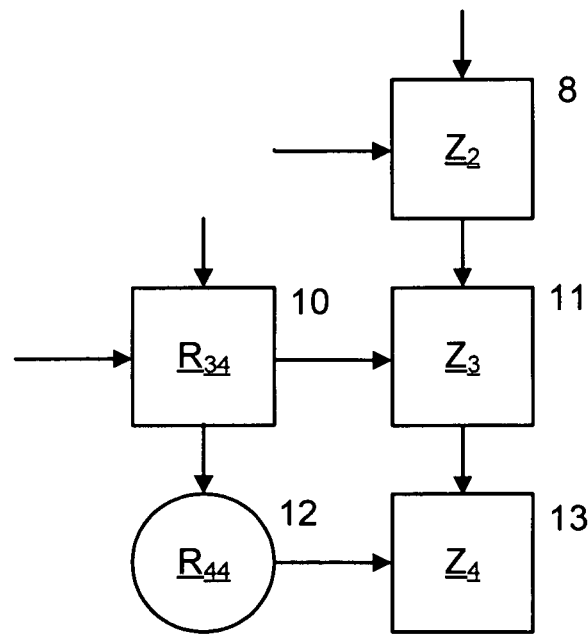
Figure 8O:
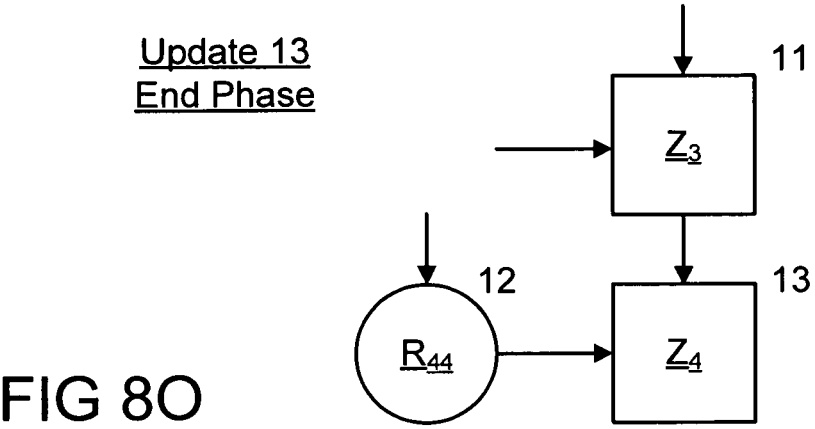
Figure 8P:
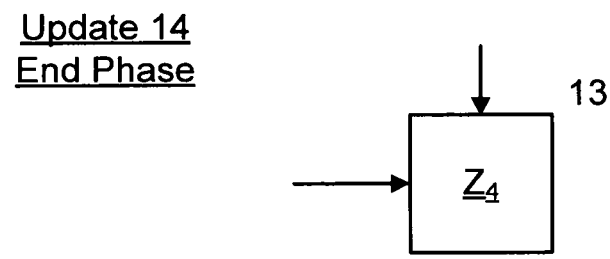

In one embodiment, for each update, only cells that have non-zero input data are processed. FIGS. 8B-P illustrate which cell(s) in the systolic array are processed at updates 0 to 14, respectively, of FIG. 8A. In FIGS. 8B-P the number to the right of each cell represents the address of that cell's r or z' value in internal memory 120, more specifically, it represents the systolic cell address of that cell in systolic cell values memory 122.

As can be seen from FIGS. 8B-E and FIGS. 7B-E, updates 0 to 3 of the two embodiments are identical. Updates 4 to 10 of FIGS. 8F-L, however, are different from updates 4 to 10 of FIGS. 7F-L. In FIG. 8A, there is a middle phase 835 that is absent from FIG. 7A. As a result, in FIG. 8A, calculating elements of the output matrix R and modified column vector Z' involves 8 iterations, whereas in FIG. 7A, those calculations involve 4 iterations. As a result, for example, during update 4 of FIG. 8F, cell $R_{11}$ continues to process new data to calculate another update of $r_{11}$. Only at update 8 of FIG. 8K, does cell $R_{11}$ no longer process new data to calculate an update of $r_{11}$ as that process was completed during update 7 with the calculation of $r_{11}(7)$ which represents the final value of $r_{11}$ in the embodiment of FIG. 8A. The other cells also end processing new data to calculate their respective elements after seven updates. With the exception of this feature, updates 4 to 10 of FIGS. 8F-L proceed in a manner similar to the progression of update 4 to 10 of FIG. 7F-L. Updates 11-14 of FIGS. 8M-P proceed in a manner similar to the progression of updates 0-10 of FIGS. 8B-L.

As can be seen from FIGS. 7A and 8A, the data for the last 3 updates in each of the embodiments consists of zeros. In other words, rows 719 to 721 corresponding to updates 8 to 10 in FIG. 7A and rows 823 to 825 corresponding to updates 12-14 in FIG. 8A consist of zeros. This is to allow the last data input into cell $Z_1$ to be processed down to $Z_4$. Generally, there would be N−1 such zero rows, where N represents the size of the vector Z. As these rows consist of only zeros, they need not be fed into input I/F 105. Instead, the processing of these rows is performed implicitly by scheduler 130.

In FIGS. 8B-P, the 15 updates involve processing 112 cells. Without the optimizations of processing only cells with non-zero input data, the 15 updates would have involved processing 15*14=210 cells. Thus, a potential improvement of about 46% exists. It is to be noted that the more updates there are, the longer the middle phase is relative to the start and end phases, as a result of which the benefit of the scheduler optimizations is reduced.

It is to be noted that, in the embodiments of FIGS. 7A-L and FIGS. 8A-P, the PE is time shared to process all the cells in systolic array 200. It is also to be noted that when used in multiple matrix decomposition mode, the PE can process elements of multiple matrices simultaneously.

The input data values $X_1(0)$ to $X_1(3)$, $X_2(0)$ to $X_2(3)$, $X_3(0)$ to $X_3(3)$, $X_4(0)$ to $X_4(3)$, and $Z(0)$ to $Z(3)$ in FIG. 7A are stored in input memory 110 (shown in FIG. 1). Similarly, input data values $X_1(0)$ to $X_1(7)$, $X_2(0)$ to $X_2(7)$, $X_3(0)$ to $X_3(7)$, $X_4(0)$ to $X_4(7)$, and $Z(0)$ to $Z(7)$ shown in FIG. 8A are also stored in input memory 110.

On the other hand, rotation angle values, e.g., $\theta_{11}(0)$ to $\theta_{11}(3)$, are stored in internal memory 120. More specifically, they are stored in rotation angles memory 121 of internal memory 120. In the examples of FIGS. 7A and 8A, it is assumed that the input data values are real and therefore, cells providing rotations angles only provide one rotation angle per update. However, for complex input data, each cell providing rotation angles would provide two rotation angles (as illustrated in FIGS. 5 and 6) per update. Thus, such cells would provide rotation angles $\theta$ and $\emptyset$ per update. Both of these rotation angles would be stored in internal memory 120.

Similarly, systolic cell values are also stored in internal memory 120. More specifically, they are stored in systolic cell values memory 122 of internal memory 120. The systolic cell values include the final and estimated values for elements of output matrix R and the final and estimated values for elements of modified column vector Z'. In the examples of FIGS. 7A and 8A, the final values for elements of output matrix R are $r_{11}$, $r_{12}$, $r_{13}$, $r_{14}$, $r_{22}$, $r_{23}$, $r_{24}$, $r_{33}$, $r_{34}$, and $r_{44}$, whereas the final values for elements of modified column vector Z' are $z'_1$, $z'_2$, $z'_3$, and $z'_4$. In the example of FIG. 7A, estimates of $r_{11}$ are $r_{11}(0)$, $r_{11}(1)$, and $r_{11}(2)$. It is to be noted that, in the example of FIG. 7A, $r_{11}(3)$ is $r_{11}$. Similarly, in the example of FIG. 7A, estimates of $z'_1$ are $z'_1(0)$, $z'_1(1)$, and $z'_1(2)$. It is to be noted that, in the example of FIG. 7A, $z'_1(3)$ is $z'_1$. The estimates of the other elements of output matrix R and of the other elements of modified column vector Z' are named in a like manner. As discussed below, each systolic cell value has a dedicated location in internal memory 120, more specifically in systolic cell values memory 122. In one embodiment, when an update estimate of a systolic value is calculated for a particular element, it replaces the previous estimate stored in systolic cell values memory 122 for that particular element.

Similarly, systolic cell internal input values are also stored in internal memory 120. More specifically, they are stored in systolic cell internal input values memory 123 of internal memory 120. The systolic cell internal input values include values generated by each non-diagonal cell (or internal cell) as an input value to a cell vertically below the cell in the row immediately below the cell in the systolic array. In the example of FIG. 7A, the systolic cell internal input values include $X_{12}(0)$ to $X_{12}(3)$, $X_{13}(0)$ to $X_{13}(3)$, $X_{14}(0)$ to $X_{14}(3)$, $Z_1(0)$ to $Z_1(3)$, $X_{23}(0)$ to $X_{23}(3)$, $X_{24}(0)$ to $X_{24}(3)$, $Z_2(0)$ to $Z_2(3)$, $X_{34}(0)$ to $X_{34}(3)$, and $Z_3(0)$ to $Z_3(3)$.

In one embodiment, whether data calculated by a cell is written to internal memory 120 depends on (1) whether the data is a rotation angle value, a systolic cell internal input value, or a systolic cell value and (2) whether the cell is a last cell in a row, a boundary cell, or a cell on the last row. Systolic cell values calculated by any cell in the systolic array are written back to internal memory 120. A boundary cell writes back a rotation angle value, but not a systolic cell internal input value, to internal memory 120 as a boundary cell does not calculate a systolic cell internal input value. Similarly, a last cell in a row that is not the last row writes back a systolic cell internal input value, but not a rotation angle value, as there are no cells to which it would provide a rotation angle value. Similarly, a cell in the last row, other than the last cell in the last row, writes back a rotation angle value to internal memory 120, but not a systolic cell internal input value as there are no cells below the cell. As noted above, the control information sent from scheduler 130 to PE 140 instructs the PE whether to write data back to internal memory 120 and where to write back that data in internal memory 120.

As discussed above, internal memory 120 includes rotation angles memory 121 for storing rotation angles, systolic cell values memory 122 for storing systolic cell values, and systolic cell internal input values memory 123 for storing systolic cell internal input values. In one embodiment, rotation angles memory 121 and systolic cell internal input values memory 123 are FIFO memories, whereas systolic cell values memory 122 is an addressable memory (e.g., a random access memory (RAM)). This information is used by scheduler 130 in instructing PE 140 where to write data in internal memory 120.

In one embodiment, the minimum depth of input memory 110 is large enough to store one row of input data, as the scheduler must be able to read all row inputs on consecutive clock cycles. In one embodiment, one row of storage space equates to N+1 number of locations, where N is an integer that represents the number of columns in an input matrix, which is equal to the number of coefficients/variables to calculate, and where the input matrix is a square matrix it also represents the input matrix order. In one embodiment, the depth of input memory 110 is such that by the time scheduler 130 has finished the previous update, the next row of input data is available. In some embodiments, particularly where the input matrix size is small, e.g., the input matrix is a 2 by 2 matrix, a larger minimum input memory depth may be needed. It is to be noted that the above input memory sizes apply in the context of both single and multiple matrix decompositions.

In one embodiment, rotation angles memory 121 includes a memory location for every systolic cell for every one of the M matrices, where M is as defined below. In such a case, rotang_depth, the depth of rotation angles memory 121 is given by the following equation:

$$\text{rotang\_depth} = M*N(N+3)/2, \quad \text{Equation 2}$$

where M is an integer that represents the number of matrices that matrix decomposition circuit 100 is to decompose in parallel and N is as defined above.

As noted above, rotation angles memory 121 may be a FIFO memory, as the order the angles are generated in one update is exactly the same order in which they are used in the next update. This still applies even when the optimization detailed above where only cells with non-zero inputs are processed is applied. It also applies during multiple matrix decomposition.

In one embodiment, if the input data is always available, and given that the PE is fully pipelined and applies no back-pressure, the rotang_depth can be much less than the value provided above in equation 2. Assuming a new data value is fed into PE 140 every clock cycle, the delay before the next update for the same matrix is due to occur is given by the following equation:

$$M\text{update\_delay} = M*N(N+3)/2, \quad \text{Equation 3}$$

where Mupdate_dealy represents the delay in clock cycles before the next update for the same matrix is due to occur, and M and N are as defined above. It is to be noted that equation 3 is based on the assumption that all cells of the systolic array, rather than only the non-zero input cells, are processed. Provided that Mupdate_dealy is greater than the PE_delay, the processing delay through the PE, and it preferably is, as otherwise the selected value for M is too low, by the time this next update is required, the number of values calculated and output from the PE is given by the following equation:

$$\text{rotang\_depth\_opt} = (M\text{update\_delay} - \text{PE\_delay}), \quad \text{Equation 4}$$

where rotang_depth_opt also represents the number of memory locations for storing the number of values calculated and output from the PE under the conditions outlined above.

In one embodiment, the depth of systolic cell internal input values memory 123, syscell_intip_depth is given by the following equation:

$$\text{syscell\_intip\_depth} = M*N(N+3)/2, \quad \text{Equation 5}$$

where M and N are as defined above. Provided that Mupdate_dealy is greater than the PE_delay, the processing delay through the PE, and it preferably is, as otherwise the selected value for M is too low, by the time this next update is required, the number of values calculated and output from the PE is given by the following equation:

$$\text{syscell\_intip\_depth\_opt} = (M\text{update\_delay} - \text{PE\_delay}), \quad \text{Equation 6}$$

where syscell_intip_depth_opt also represents the number of memory locations for storing the number of values calculated and output from the PE under the conditions outlined above.

In one embodiment, systolic cell values memory 122 includes a dedicated memory location to store each systolic cell value for every one of the M matrices. Also in one embodiment, systolic cell values memory 122 is a dual port addressable memory. In one embodiment, PE 140 writes data to systolic cell values memory 122 via one of the dual ports, and scheduler 130 reads data from systolic cell values memory 122 via the other port of the dual ports. In one embodiment, systolic cell values memory 122 is addressable to allow scheduler 130 to perform the optimization detailed above where only the cells with non-zero inputs are processed. In one embodiment, the depth of systolic cell values memory 122 is given by the following equation:

$$\text{Syscell\_depth}=M*N(N+3)/2, \quad \text{Equation 7}$$

where Syscell_depth represents the depth of systolic cell values memory 122, and M and N are as defined above. It is to be noted that for QRD-RLS decomposition, M is replaced by Mtotal in the above equation, where Mtotal is an integer that represents the total number of matrices to be decomposed.

It is to be noted that the above values for the different memories are minimum size estimates. Those skilled in the art would recognize that the actual minimum memory size used would be the smallest number $2^Y$ (where Y is an integer) that is greater than or equal to the size estimate.

Figure 9:
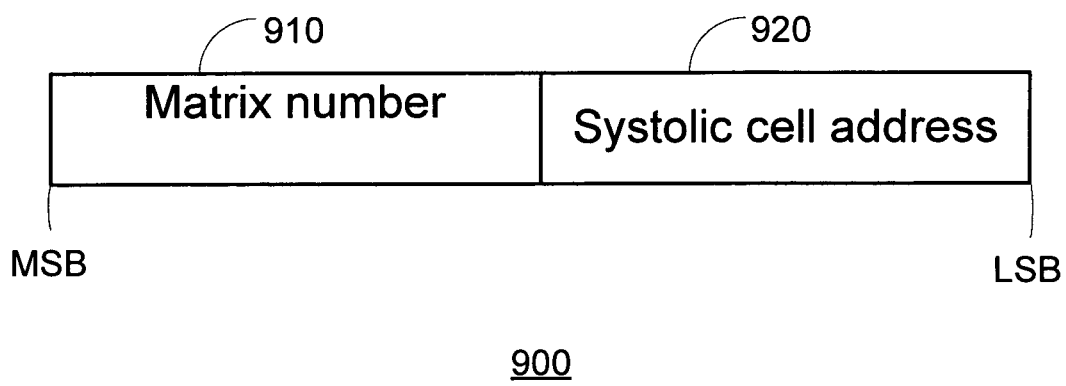
FIG. 9 illustrates one embodiment of the address of a systolic cell values memory location.

In one embodiment, systolic cell values memory 122 is an addressable memory. FIG. 9 illustrates one embodiment of the address of a systolic cell values memory location. In FIG. 9, address 900 includes a matrix number part 910, which includes the most significant bit (MSB), and a systolic cell address part 920, which includes the least significant bit (LSB). The matrix number part 910 is for storing the matrix number of the matrix to which the systolic cell value belongs, whereas systolic cell address part 920 is for storing the address for the systolic cell in the systolic cell array. In one embodiment, the systolic cell addresses are numbered from 0 to Ncell−1 in the following order: starting at the boundary cell in the first row, continuing with the rest of the cells in the first row from left to right, moving to each of the other rows in order from the second row down to the last row, and for each row after the first row, following the same order for numbering as in the first row. For example, in systolic array 200, the systolic array cells $R_{11}$, $R_{12}$, $R_{13}$, $R_{14}$, $Z_1$, $R_{22}$, $R_{23}$, $R_{24}$, $Z_2$, $R_{33}$, $R_{34}$, $Z_3$, $R_{44}$, and $Z_4$ have addresses 0-13, respectively.

As noted above, scheduler 130 determines the order in which cells of the systolic array are processed. Accordingly, it determines which systolic cell to process next, so that the correct data can be read from the input and internal memories. Given that rotation angles memory 121 and systolic cell internal input values memory 123 are FIFO memories, no special decoding is required for these memories as scheduler 130 merely reads the next entry from the FIFO memories for the rotation angles and the systolic cell internal input values. In one embodiment, scheduler 130 uses simple counters to keep track of the last entry read from these FIFO memories and the next entry to read from them. It is to be noted that despite the fact that only some systolic cells are processed in each update, rotation angles memory 121 and systolic cell internal input values memory 123 can still be FIFO memories, since if they contain data for a particular systolic cell, that cell must be processed on the next pass. It is also to be noted that rotation angles memory 121 and systolic cell internal input values memory 123 can still be FIFO memories even when matrix decomposition circuit 100 operates in multiple matrix decomposition mode, which is described below.

Scheduler 130 also determines which systolic cell values to read from systolic cell values memory 122. Scheduler 130 does this by determining which cells in the systolic array, e.g., systolic array 200, are to be processed. This is accomplished using counters in scheduler 130 in a manner consistent with the procedures outlined in the pseudo-code provided at the end of the Detailed Description and entitled "Pseudo-Code For Start Phase", "Pseudo-Code For Middle Phase", and "Pseudo-Code For End Phase". Once the cells are determined, the address for those cells in systolic cell values memory 122 is determined using the addressing scheme described above. In addition, if the systolic cell is in the first row then the appropriate data from input memory 110 is read. By determining which cells in the systolic array are to be processed, scheduler 130 can also determine if any of those cells are in the first row and read data from input memory 110, if necessary. Additionally, scheduler 130 determines whether a systolic cell is to be reset and acts accordingly as described below.

In one embodiment, cells in PE 140 may have a latency of approximately 50 clock cycles, for 16 bit complex number inputs and three physical CORDIC implementations of the cells. Also, as a result of the data dependency between adjacent cells illustrated above, the next update requires results of a previous update for processing. There may, therefore, be a delay of approximately 50 cycles between each set of consecutive updates. For input matrix sizes of less than 9 by 9 (which equates to 54 cells in the systolic array), there would be a stall period after every update to allow the new values to become available before commencing the next update.

In one embodiment, matrix decomposition circuit 100 may operate in single matrix decomposition mode or multiple matrix decomposition mode (which may also herein be referred to as parallel matrix decomposition mode, parallel matrix decomposition, or parallel matrix processing). In single matrix decomposition mode, matrix decomposition circuit 100 entirely decomposes a single input matrix into an output matrix within a certain time period prior to proceeding to the decomposition of a next input matrix into an output matrix. In multiple matrix decomposition mode, matrix decomposition circuit 100 decomposes M multiple input matrices (where M is an integer greater than 1 representing the number of input matrices decomposed together) within a certain period of time prior to proceeding to a new batch of multiple input matrices for decomposition. In multiple matrix decomposition mode, before entirely decomposing one matrix of the M matrices, matrix decomposition circuit 100 decomposes part of at least one other matrix of the M matrices. In one embodiment, M is a synthesis time parameter. In another embodiment, M may be defined at other times.

For single matrix decompositions, the stall time may be reduced by (1) selecting a PE implementation with lower latency or (2) processing cells in the systolic array on diagonals as opposed to rows. Single matrix decompositions in areas of DPD or joint detection involve large matrix sizes such as 32 by 32 or 80 by 80. As a result, once a sufficient number of cells are being processed, there should be little or no stall time. It is likely that DPD or joint detection would involve use of recursive techniques, such as QRD-RLS, and as a result the matrices to be decomposed would include more rows than columns.

Small matrix decompositions (e.g., 2 by 2, 4 by 4, or 8 by 8) are envisaged to be required in areas such as MIMO in Orthogonal Frequency Division Multiplexing (OFDM) systems where there are many independent parallel matrices to decompose. Thus, MIMO in OFDM systems are likely to involve parallel matrix decomposition. In parallel matrix decompositions, the scheduler processes the cells in an order to mitigate (hide) the PE latency. In one embodiment, assuming the scheduler is instructed there are M different matrices to decompose in parallel, the processing order is as follows:

For matrix 1, perform 0 update (i.e., process all required cells in systolic array);
For matrix 2, perform 0 update (i.e., process all required cells in systolic array);
. . .
For matrix M perform 0 update (i.e., process all required cells in systolic array);

For matrix 1, perform 1 update (i.e., process all required cells in systolic array);
For matrix 2, perform 1 update (i.e., process all required cells in systolic array);
...
For matrix M perform 1 update (i.e., process all required cells in systolic array);
For matrix 1, perform next update (i.e., process all required cells in systolic array);
For matrix 2, perform next update (i.e., process all required cells in systolic array)
...
For matrix M, perform next update (i.e. process all required cells in systolic array); and
Continue with the same order for all other updates.

In such a situation, the results of a particular update for a particular matrix need be available in M updates time (as opposed to the next update) to hide PE latency. Thus, in most circumstances the PE latency is hidden, and so there will be no need for any stall periods. The cost of this higher throughput is increased memory requirements. This is discussed in more detail below.

In one embodiment, PE 140 includes 50 processing cells. While some cells in PE 140 are used to process elements of one output matrix of the M output matrices, other cells in PE 140 may be used to process elements of one or more other output matrices.

In one embodiment, the value for M is far less than the total number of matrices (Mtotal) to decompose (thus reducing memory requirements). In one embodiment, the value of M is only large enough to ensure that the PE latency is hidden (i.e., no stall times). This is discussed in more detail below.

For single matrix decomposition, as illustrated in FIGS. 7A and 8A, each row of inputs is fed into input I/F 105 (shown in FIG. 1) and are stored in input memory 110 (shown in FIG. 1). In one embodiment, zeros in the start and end-phase need not be fed into input I/F 105 or stored in input memory 110.

In one embodiment, for M multiple matrix decompositions, the data input order is as follows:
Input row 1 of inputs for matrix 1;
Input row 1 of inputs for matrix 2;
...
Input row 1 of inputs for matrix M;
Input row 2 of inputs for matrix 1;
Input row 2 of inputs for matrix 2;
...
Input row 2 of inputs for matrix M;
Continue in the same order for all the other rows.

Every time a row of inputs for matrix 1 is being fed into the matrix decomposition circuit (more specifically, the input I/F of the matrix decomposition circuit), input control information becomes valid. This control information will dictate what phase (start, middle or end) the scheduler should operate in and whether the systolic array is to be reset first. This information applies to this and all following M−1 matrices. In one embodiment, zero data inputs need not be explicitly fed in. Also, in one embodiment the present invention utilizes a control tag indicating which non-zero input data is being fed in and which matrix the data is for.

In one embodiment, the systolic array cell values ($r_{ij}$ and $z'_1$ values) are read out of internal memory in the order suited for back-substitution. In the examples depicted in FIGS. 7A and 8A, the values are output in the following order: $z'_4$, $r_{44}$, $z'_3$, $r_{34}$, $r_{33}$, $z'_2$, $r_{24}$, $r_{23}$, $r_{22}$, $z_1$, $r_{14}$, $r_{13}$, $r_{12}$, and $r_{11}$. This is opposite to the order in which the cells are processed. In one embodiment, scheduler 130 does not start the next new decompositions until these values are output. This period of time effectively reduces the maximum throughput of the design.

In another embodiment, during the end phase, the final systolic cell outputs are stored in a dedicated output memory instead of the systolic memory. The systolic array cell values are then output from this memory in the order suited to back substitution (such as the one mentioned above). In such an embodiment, the scheduler can start the next new decomposition upon termination of the end phase. Due to the staggered nature of the different inputs (in relation to time), in one embodiment, the cell outputs would be written for each diagonal on each update during the end phase. The higher throughput of this embodiment is achieved at the cost of greater complexity and additional memory (i.e., the dedicated output memory). For large single matrix decompositions or large M value for multiple matrix decompositions, this additional memory could become significant.

In another embodiment, the systolic cell outputs are output in the order in which they are processed, i.e., in an order opposite to the one provided above. This allows for increased throughput. However, it involves use of an additional memory similar to the dedicated output memory described above.

If the total number of matrices to decompose is given by Mtotal, as noted above, it is not necessary in all cases that M equal Mtotal, where M is the number of matrices the reference design is instructed there is and represents the number of matrices to be decomposed in parallel. In fact, in one embodiment, where possible it is desirable to have M as small as possible as this reduces the memory requirements.

In one embodiment of the QRD case, if M is a factor of Mtotal, then data is fed into the matrix decomposition circuit for a group of M matrices until they have been decomposed and results output, then data for the next group of M matrices is fed into the matrix decomposition circuit. Thus the same internal memory is used for each group of M matrices. In such an embodiment, all of the different groups of M matrices are sequentially decomposed by the same matrix decomposition circuit. In another embodiment, each M matrices of the group of Mtotal matrices may be assigned to a different matrix decomposition circuit (which may also herein be referred to as a matrix decomposition module) for decomposition. In such an embodiment, there would be multiple matrix decomposition modules, one for each group of M matrices. Such multiple matrix decomposition modules can be created by instantiating multiple instances of the matrix decomposition module.

In one embodiment, the size of M is such that after an update has been performed on all M matrices, the outputs from the update for the first matrix are available, which allows the next update for the first matrix (and then similarly for the other matrices) to proceed without delay. In such an embodiment, the value of M is determined as follows:

$$M = \mathrm{ceil}(PE\_delay/Ncells), \qquad \text{Equation 8}$$

where "ceil" represents a ceiling function which rounds up the result of (PE_delay/Ncells) to the nearest integer and where Ncells represents the number of cells in the systolic array.

As indicated by equation 1 above, Ncells is equal to $N(N+3)/2$. Replacing Ncells by $N(N+3)/2$ in equation 8 above and assuming PE is fully pipelined and can accept a new data sample every clock cycle, equation 8 above can be rewritten as follows:

$$M = \mathrm{ceil}(2*PE\_delay/N(N+3)) \qquad \text{Equation 9}$$

The required depth of memories is given by how many outputs will be available after M updates, and this is given by the following equation:

$$\text{min\_mem\_depth} = M * N\text{cells} - PE\_\text{delay} \qquad \text{Equation 10}$$

It is to be noted that the depth of memories for rotation angles memory 121 and systolic cell internal input values memory 123 respectively given by equations 4 and 6 above are basically represented by equation 10 above. It is also to be noted that in one embodiment of QRD-RLS, M=Mtotal in equations 8 to 10 above.

In one embodiment, where each of the M matrices of the group of Mtotal matrices is decomposed using a different matrix decomposition module, the number of matrix decomposition modules needed can be reduced by using the scheduler optimization described above where only cells with non-zero inputs are processed. This, however, would come at the cost of increased memory as M would be larger than it would otherwise have been without the optimization.

Below is a brief description of the "Pseudo-Code For Start Phase", "Pseudo-Code For Middle Phase", and "Pseudo-Code For End Phase" provided at the end of the Detailed Description and herein collectively referred to as the pseudo code for scheduling matrix decomposition or pseudo code for determining which systolic cell to process. To the extent there are any inconsistencies between the pseudo code and the below brief description thereof, the brief description should be interpreted in a manner consistent with the method set forth in the pseudo code. The pseudo code uses the variables described in table 1 below and includes procedures for determining which cells to process during the start, middle, and end phases:

TABLE 1

| Variable Name | Possible Values | Description |
| --- | --- | --- |
| N | Fixed (user defined) | Number of different inputs |
| mtx_no | 0 to 1 – M | Matrix number |
| Phase | start, middle OR end | Scheduler phase of operation |
| diag_addr | 0 to N(N + 3)/2 – 2 | Address of boundary cell in current row |
| ncells_row | 0 to N + 1 | Max possible cells in current row |
| ncells_row_del | –ve, 0 to N + 1 | No of cells not to process in current row |
| ncells_row_raw | –ve, 0 to 2N | "raw" number of cells in row |
| ncells_row_act | 0 to N + 1 | Actual number of cells in row |
| start_row_valid_cell | 0 to N(N + 3)/2 – 1 | First cell to process in current row |
| cell_addr | 0 to N(N + 3)/2 – 1 | Address of cell to process |
| row_no | 0 to N – 1 | Number of row being processed |
| start_cnt | 0 to N – 1 | Update count for Start phase |
| end_cnt | 0 to 2N – 2 | Update count for End phase |
| start_row_no | 0 to N – 1 | Row number to start processing from |
| next_diag_addr | 0 to N(N + 3)/2 – 2 | Next row's diagonal address |
| next_ncells_row | 0 to N + 1 | Max possible cells in next row |

It is to be noted that in the above description, matrices are numbered starting from 1. However, in the pseudo-code provided at the end of the Detailed Description, the matrices are numbered starting from 0. Similarly, in the above description, row numbers (and column numbers for both cells in the systolic array and elements of matrices) are numbered starting from 1. However, in the pseudo-code provided at the end of the Detailed Description, the rows are numbered starting from 0.

During the start phase, for each update of the start phase (i.e., for start_cnt of 0 to N–1), for each matrix (i.e., mtx_no 0 to M–1), the variables diag_addr, ncells_row, and ncells_row_act are initialized as 0, N+1, and start_cnt+1, respectively. Within the above loop, for each required row of the systolic array (i.e., for row_no 0 to (floor(start_cnt/2))), the first cell address in a row is determined, the cell addresses for cells to process in the current row are generated, and the variables for the next row iteration are updated. The first cell address in a row is determined by setting start_row_valid_cell equal to diag_addr and setting cell_addr equal to start_row_valid_cell. The cells addresses for cells to process in the current row are generated as follows. For i equal to 0 to ncells_row_act–1, cell_addr is equal to cell_addr+i. The variables for the next row iteration are updated as follows. The value of ncells_row_act is decremented by 2, the value of diag_addr is incremented by adding the value of ncells_row thereto, and the value of ncells_row is decremented by 1. After the loops for row_no 0 to (floor(start_cnt/2)), mtx_no 0 to M–1 and start_cnt 0 to N–1 are closed, the variables required for the next phase are setup. More specifically, ncells_row_raw is set to N+1. The next phase can be a middle phase or an end phase.

In the middle phase, a variable tempA is assigned the value of ncells_row_raw. During the middle phase, for each marix (i.e., mtx_no 0 to M–1), the variables diag_addr, ncells_row, and ncells_row_raw are initialized as 0, N+1, and tempA, respectively. Within the above loop, for each required row of the systolic array (i.e., for row_no 0 to N–1), the first cell address in a row is determined, the number of cells to process in the current row is determined, the cell addresses for cells to process in the current row are generated, and the variables for the next row iteration are updated. The first cell address in a row is determined by setting start_row_valid_cell equal to diag_addr and setting cell_addr equal to start_row_valid_cell. The number of cells to process in the current row is determined as follows. If ncells_row_raw is greater than 0 and if ncells_row_raw is greater than ncells_row, then ncells_row_act is equal to ncells_row. If ncells_row_raw is greater than 0 but ncells_row_raw is not greater than ncells_row, then ncells_row_act is equal to ncells_row_raw. If ncells_row_raw is not greater than 0, then ncells_row_act is equal to 0. The cells addresses for cells to process in the current row are generated as follows. For i equal to 0 to ncells_row_act–1, cell_addr is equal to cell_addr+i. The variables for the next row iteration are updated as follows. The value of ncells_row_act is decremented by 2, the value of diag_addr is incremented by adding the value of ncells_row thereto, and the value of ncells_row is decremented by 1. After the loops for row_no 0 to N–1 and mtx_no 0 to M–1 are closed, ncells_row_raw is set to tempA. Also, if ncells_row_raw is not equal to 2N, then ncells_row_raw is incremented by 1. Otherwise, ncells_row_raw is equal to 2N.

During the end phase, for each update of the end phase (i.e., for end_cnt of 0 to 2N–2), a variable tempA is assigned the value of ncells_row_raw. Within the above loop, for each marix (i.e., mtx_no 0 to M–1), ncells_row_raw is set equal to tempA. Within the above loop, the variables for this update cycle in the end phase are determined, the variables for the next update cycle in the end phase are determined for updates N+1 of the end phase and upwards, and each required cell of the systolic array are processed. The variables for this update cycle in the end phase are determined as follows. If end_cnt is less than N, then ncells_row_del, start_row_no, diag_addr, and ncells_row are respectively set to end_cnt+1, 0, 0, and N+1. Otherwise, start_row_no, diag_addr, and ncells_row are respectively set to end_cnt–N+1, next_diag_addr, and next_ncells_row. If end_cnt is not less than N and if end_cnt is equal to N, then ncells_row_del is set to N–1. If end_cnt is not less than N and if end_cnt is not equal to N, then ncells_row_del is decremented by 1. The variables for the next update cycle in the end phase are determined as follows. As noted above, this is done for only updates N+1 of the end phase and upwards. The variables next_diag_addr and next_ncells_row are respectively set to diag_addr+ncells_row and ncells_row−1. Processing each required cell of the systolic array is done as follows. For each required row of the systolic array (i.e., for row_no equal to start_row_no to N−1), the first cell address in a row is determined, the number of cells to process in the current row is determined, the cell addresses for cells to process in the current row are generated, and the variables for the next row iteration are updated. The first cell address in a row is determined by setting start_row_valid_cell equal to diag_addr+ncells_row_del and setting cell_addr equal to start_row_valid_cell. The number of cells to process in the current row is determined as follows. If ncells_row_raw is greater than 0 and if ncells_row_raw is greater than ncells_row, then ncells_row_act is equal to ncells_row−ncells_row_del. If ncells_row_raw is greater than 0 but ncells_row_raw is not greater than ncells_row, then ncells_row_act is equal to ncells_row_raw−ncells_row_del. If ncells_row_raw is not greater than 0, then ncells_row_act is equal to 0. The cells addresses for cells to process in the current row are generated as follows. For i equal to 0 to ncells_row_act−1, cell_addr is equal to cell_addr+i. The variables for the next row iteration are updated as follows. The value of ncells_row_raw is decremented by 2, the value of diag_addr is incremented by adding the value of ncells_row thereto, and the value of ncells_row is decremented by 1. If ncells_row_del is greater than 2, then ncells_row_del is decremented by 2. Otherwise, ncells_row_del is set equal to 0. After the loop for mtx_no 0 to M−1 is closed, ncells_row_raw is set to tempA. Also, if ncells_row_raw is not equal to 2N, then ncells_row_raw is incremented by 1. Otherwise, ncells_row_raw is equal to 2N.

Using the pseudo code provided at the end of the Detailed Description in the context of the example of FIGS. 8A-8P, values for the variables in table 1 are determined. The values determined for this example are shown below in table 2.

TABLE 2

| Update cycle | Phase | Start_cnt | End_cnt | Row_no | Diag_addr/ (next_diag_addr) | Ncells_row/ (next_ncells_row) | Ncells_row_raw | Ncells_row_del | Ncells_row_act | Start_row_valid_cell | Cell_addr | Cell Emuneration |
|---|---|---|---|---|---|---|---|---|---|---|---|---|
| 0 | START | 0 | | 0 | 0 | 5 | 1 | 0 | 1 | 0 | 0 | $R_{11}$ |
| 1 | | 1 | | 0 | 0 | 5 | 2 | | 2 | 0 | 0 | $R_{11}$ |
| | | | | | | | | | | | 1 | $R_{12}$ |
| 2 | | 2 | | 0 | 0 | 5 | 3 | | 3 | 0 | 0 | $R_{11}$ |
| | | | | | | | | | | | 1 | $R_{12}$ |
| | | | | | | | | | | | 2 | $R_{13}$ |
| | | | | 1 | 5 | 4 | 1 | | 1 | 5 | 5 | $R_{22}$ |
| 3 | | 3 | | 0 | 0 | 5 | 4 | | 4 | 0 | 0 | $R_{11}$ |
| | | | | | | | | | | | 1 | $R_{12}$ |
| | | | | | | | | | | | 2 | $R_{13}$ |
| | | | | | | | | | | | 3 | $R_{14}$ |
| | | | | 1 | 5 | 4 | 2 | | 2 | 5 | 5 | $R_{22}$ |
| | | | | | | | | | | | 6 | $R_{23}$ |
| 4 | MIDDLE | | | 0 | 0 | 5 | 5 | 0 | 5 | 0 | 0 | $R_{11}$ |
| | | | | | | | | | | | 1 | $R_{12}$ |
| | | | | | | | | | | | 2 | $R_{13}$ |
| | | | | | | | | | | | 3 | $R_{14}$ |
| | | | | | | | | | | | 4 | $Z_1$ |
| | | | | 1 | 5 | 4 | 3 | | 3 | 5 | 5 | $R_{22}$ |
| | | | | | | | | | | | 6 | $R_{23}$ |
| | | | | | | | | | | | 7 | $R_{24}$ |
| | | | | 2 | 9 | 3 | 1 | | 1 | 9 | 9 | $R_{33}$ |
| | | | | 3 | 12 | 2 | −1 | | 0 | — | — | — |
| 5 | | | | 0 | 0 | 5 | 6 | | 5 | 0 | 0 | $R_{11}$ |
| | | | | | | | | | | | 1 | $R_{12}$ |
| | | | | | | | | | | | 2 | $R_{13}$ |
| | | | | | | | | | | | 3 | $R_{14}$ |
| | | | | | | | | | | | 4 | $Z_1$ |
| | | | | 1 | 5 | 4 | 4 | | 4 | 5 | 5 | $R_{22}$ |
| | | | | | | | | | | | 6 | $R_{23}$ |
| | | | | | | | | | | | 7 | $R_{24}$ |
| | | | | | | | | | | | 8 | $Z_2$ |
| | | | | 2 | 9 | 3 | 2 | | 2 | 9 | 9 | $R_{33}$ |
| | | | | | | | | | | | 10 | $R_{34}$ |
| | | | | 3 | 12 | 2 | 0 | | 0 | — | — | — |
| 6 | | | | 0 | 0 | 5 | 7 | | 5 | 0 | 0 | $R_{11}$ |
| | | | | | | | | | | | 1 | $R_{12}$ |
| | | | | | | | | | | | 2 | $R_{13}$ |
| | | | | | | | | | | | 3 | $R_{14}$ |
| | | | | | | | | | | | 4 | $Z_1$ |
| | | | | 1 | 5 | 4 | 5 | | 4 | 5 | 5 | $R_{22}$ |
| | | | | | | | | | | | 6 | $R_{23}$ |
| | | | | | | | | | | | 7 | $R_{24}$ |
| | | | | | | | | | | | 8 | $Z_2$ |
| | | | | 2 | 9 | 3 | 3 | | 3 | 9 | 9 | $R_{33}$ |
| | | | | | | | | | | | 10 | $R_{34}$ |
| | | | | | | | | | | | 11 | $Z_3$ |
| | | | | 3 | 12 | 2 | 1 | | 1 | 12 | 12 | $R_{44}$ |
| 7 | | | | 0 | 0 | 5 | 8 | 0 | 5 | 0 | 0 | $R_{11}$ |
| | | | | | | | | | | | 1 | $R_{12}$ |
| | | | | | | | | | | | 2 | $R_{13}$ |

TABLE 2-continued

| Update cycle | Phase | Start_cnt | End_cnt | Row_no | Diag_addr/ (next_diag_addr) | Ncells_row/ (next_ncells_row) | Ncells_row_raw | Ncells_row_del | Ncells_row_act | Start_row_valid_cell | Cell_addr | Cell Emuneration |
|---|---|---|---|---|---|---|---|---|---|---|---|---|
| | | | | | | | | | | | 3 | $R_{14}$ |
| | | | | | | | | | | | 4 | $Z_1$ |
| | | | | 1 | 5 | 4 | 6 | | 4 | 5 | 5 | $R_{22}$ |
| | | | | | | | | | | | 6 | $R_{23}$ |
| | | | | | | | | | | | 7 | $R_{24}$ |
| | | | | | | | | | | | 8 | $Z_2$ |
| | | | | 2 | 9 | 3 | 4 | | 3 | 9 | 9 | $R_{33}$ |
| | | | | | | | | | | | 10 | $R_{34}$ |
| | | | | | | | | | | | 11 | $Z_3$ |
| | | | | 3 | 12 | 2 | 2 | | 2 | 12 | 12 | $R_{44}$ |
| | | | | | | | | | | | 13 | $Z_4$ |
| 8 | END | | 0 | 0 | 0 (5) | 5 (4) | 8 | 1 | 4 | 1 | 1 | $R_{12}$ |
| | | | | | | | | | | | 2 | $R_{13}$ |
| | | | | | | | | | | | 3 | $R_{14}$ |
| | | | | | | | | | | | 4 | $Z_1$ |
| | | | | 1 | 5 | 4 | 6 | 0 | 4 | 5 | 5 | $R_{22}$ |
| | | | | | | | | | | | 6 | $R_{23}$ |
| | | | | | | | | | | | 7 | $R_{24}$ |
| | | | | | | | | | | | 8 | $Z_2$ |
| | | | | 2 | 9 | 3 | 4 | 0 | 3 | 9 | 9 | $R_{33}$ |
| | | | | | | | | | | | 10 | $R_{34}$ |
| | | | | | | | | | | | 11 | $Z_3$ |
| | | | | 3 | 12 | 2 | 2 | 0 | 2 | 12 | 12 | $R_{44}$ |
| | | | | | | | | | | | 13 | $Z_4$ |
| 9 | | 1 | | 0 | 0 (5) | 5 (4) | 8 | 2 | 3 | 2 | 2 | $R_{13}$ |
| | | | | | | | | | | | 3 | $R_{14}$ |
| | | | | | | | | | | | 4 | $Z_1$ |
| | | | | 1 | 5 | 4 | 6 | 0 | 4 | 5 | 5 | $R_{22}$ |
| | | | | | | | | | | | 6 | $R_{23}$ |
| | | | | | | | | | | | 7 | $R_{24}$ |
| | | | | | | | | | | | 8 | $Z_2$ |
| | | | | 2 | 9 | 3 | 4 | 0 | 3 | 9 | 9 | $R_{33}$ |
| | | | | | | | | | | | 10 | $R_{34}$ |
| | | | | | | | | | | | 11 | $Z_3$ |
| | | | | 30 | 12 | 2 | 2 | 0 | 2 | 12 | 12 | $R_{44}$ |
| | | | | | | | | | | | 13 | $Z_4$ |
| 10 | | 2 | | 0 | 0 (5) | 5 (4) | 8 | 3 | 2 | 3 | 3 | $R_{14}$ |
| | | | | | | | | | | | 4 | $Z_1$ |
| | | | | 1 | 5 | 4 | 6 | 1 | 3 | 6 | 6 | $R_{23}$ |
| | | | | | | | | | | | 7 | $R_{24}$ |
| | | | | | | | | | | | 8 | $Z_2$ |
| | | | | 2 | 9 | 3 | 4 | 0 | 3 | 9 | 9 | $R_{33}$ |
| | | | | | | | | | | | 10 | $R_{34}$ |
| | | | | | | | | | | | 11 | $Z_3$ |
| | | | | 3 | 12 | 2 | 2 | 0 | 2 | 12 | 12 | $R_{44}$ |
| | | | | | | | | | | | 13 | $Z_4$ |
| 11 | | 3 | | 0 | 0 (5) | 5 (4) | 8 | 4 | 1 | 4 | 4 | $Z_1$ |
| | | | | 1 | 5 | 4 | 6 | 2 | 2 | 7 | 7 | $R_{24}$ |
| | | | | | | | | | | | 8 | $Z_2$ |
| | | | | 2 | 9 | 3 | 4 | 0 | 3 | 9 | 9 | $R_{33}$ |
| | | | | | | | | | | | 10 | $R_{34}$ |
| | | | | | | | | | | | 11 | $Z_3$ |
| | | | | 3 | 12 | 2 | 2 | 0 | 2 | 12 | 12 | $R_{44}$ |
| | | | | | | | | | | | 13 | $Z_4$ |
| 12 | | 4 | | 1 | 5 (9) | 4 (3) | 8 | 3 | 1 | 8 | 8 | $Z_2$ |
| | | | | 2 | 9 | 3 | 6 | 1 | 2 | 10 | 10 | $R_{34}$ |
| | | | | | | | | | | | 11 | $Z_3$ |
| | | | | 3 | 12 | 2 | 4 | 0 | 2 | 12 | 12 | $R_{44}$ |
| | | | | | | | | | | | 13 | $Z_4$ |
| 13 | | 5 | | 2 | 9 (12) | 3 (2) | 8 | 2 | 1 | 11 | 11 | $Z_3$ |
| | | | | 3 | 12 | 2 | 6 | 0 | 2 | 12 | 12 | $R_{44}$ |
| | | | | | | | | | | | 13 | $Z_4$ |
| 14 | | 6 | | 3 | 12 | 2 | 8 | 1 | 1 | 13 | 13 | $Z_4$ |

As noted above, a matrix decomposition circuit of the present may operate in QRD or QRD-RLS mode. In one embodiment, whether the decomposition is to be QRD or QRD-RLS can be configured by the user during runtime. Whether the decomposition is to be QRD or QRD-RLS depends on whether there is a middle phase. The number of updates in the start phase is equal to N, while the number of updates in the end phase is equal to 2N−1. Thus, by knowing N, the scheduler can determine the number of updates in the start and end phases. The number of updates in the middle phase is a user defined parameter. More specifically, it is determined by the difference between the number of rows and columns in the input matrix. In one embodiment, the matrix size is a synthesis time parameter. In another embodiment, the matrix size may be configured at other times, e.g., during runtime. The number of updates in the middle phase can be any number from 1 through thousands and more. In one embodiment, the scheduler uses counters to determine the decomposition phase (i.e., whether the decomposition is in the start, middle or end phase). The scheduler is agnostic as to whether the case is QRD or QRD-RLS.

In one embodiment, at startup and possibly at other times (i.e., after every M matrix decompositions where there are a total of Mtotal matrices to decompose), the systolic array is reset. In one embodiment, all internal cells have a reset value of 0, whereas all boundary cells have a reset value between 0 and 1. In one embodiment, the reset value for boundary cells is user configurable during runtime. Resetting every location in internal memory may be time consuming. In one embodiment, instead of resetting every location in internal memory, the scheduler generates the reset value itself. In one embodiment, when processing a cell for the first time to decompose a particular matrix, reset values are used for that cell. The scheduler also keeps a record of when all the reset values have been sent to the PE to determine when it should resume reading data from the internal memory.

In one embodiment, for each update, the scheduler has a counter value (e.g., ncells_row_act for the previous update) that indicates how many cells were processed in the last update on a particular row. In one embodiment, the scheduler compares that counter value for the previous update with the number of cells in the particular row to process for the current update (e.g., ncells_row_act for the current update) and uses the difference between these values to determine the number of cells, if any, that need to be reset. For each row, for each update, there would at most be one cell that needs to be reset. That cell would be the cell that is to be processed on the current update but was not processed on the previous update. A cell on a row would be reset only if the counter value for the current update is greater than the counter value for the previous update.

It is to be noted that the algorithm of the present invention is suited for field programmable gate array (FPGA) implementation as it involves several counters, operating in parallel.

Matrix decomposition circuits embodying the present invention might be included in a variety of integrated circuits (ICs), including ICs that are PLDs or application specific integrated circuits (ASICs). PLDs (also sometimes referred to as complex PLDs (CPLDs), programmable array logic (PALs), programmable logic arrays (PLAs), field PLAs (FPLAs), erasable PLDs (EPLDs), electrically erasable PLDs (EEPLDs), logic cell arrays (LCAs), FPGAs, or by other names) provide the advantages of fixed ICs with the flexibility of custom ICs. Such devices typically provide an "off the shelf" device having at least a portion that can be programmed to meet a user's specific needs. ASICs have traditionally been fixed ICs. However, it is possible to provide an ASIC that has a portion or portions that are programmable. Thus, it is possible for an IC device to have qualities of both an ASIC and a PLD. The term PLD as used herein will be considered broad enough to include such devices.

PLDs have configuration elements that may be programmed or reprogrammed. Configuration elements may be realized as RAM bits, flip-flops, electronically erasable programmable read-only memory (EEPROM) cells, or other memory elements. Placing new data into the configuration elements programs or reprograms the PLD's logic functions and associated routing pathways. Configuration elements that are field programmable are often implemented as RAM cells (sometimes referred to a "configuration RAM" (CRAM)). However, many types of configurable elements may be used including static or dynamic RAM (SRAM or DRAM), electrically erasable read-only memory (EEROM), flash, fuse, and anti-fuse programmable connections. The programming of configuration elements could also be implemented through mask programming during fabrication of the device. While mask programming may have disadvantages relative to some of the field programmable options already listed, it may be useful in certain high volume applications.

Figure 10:
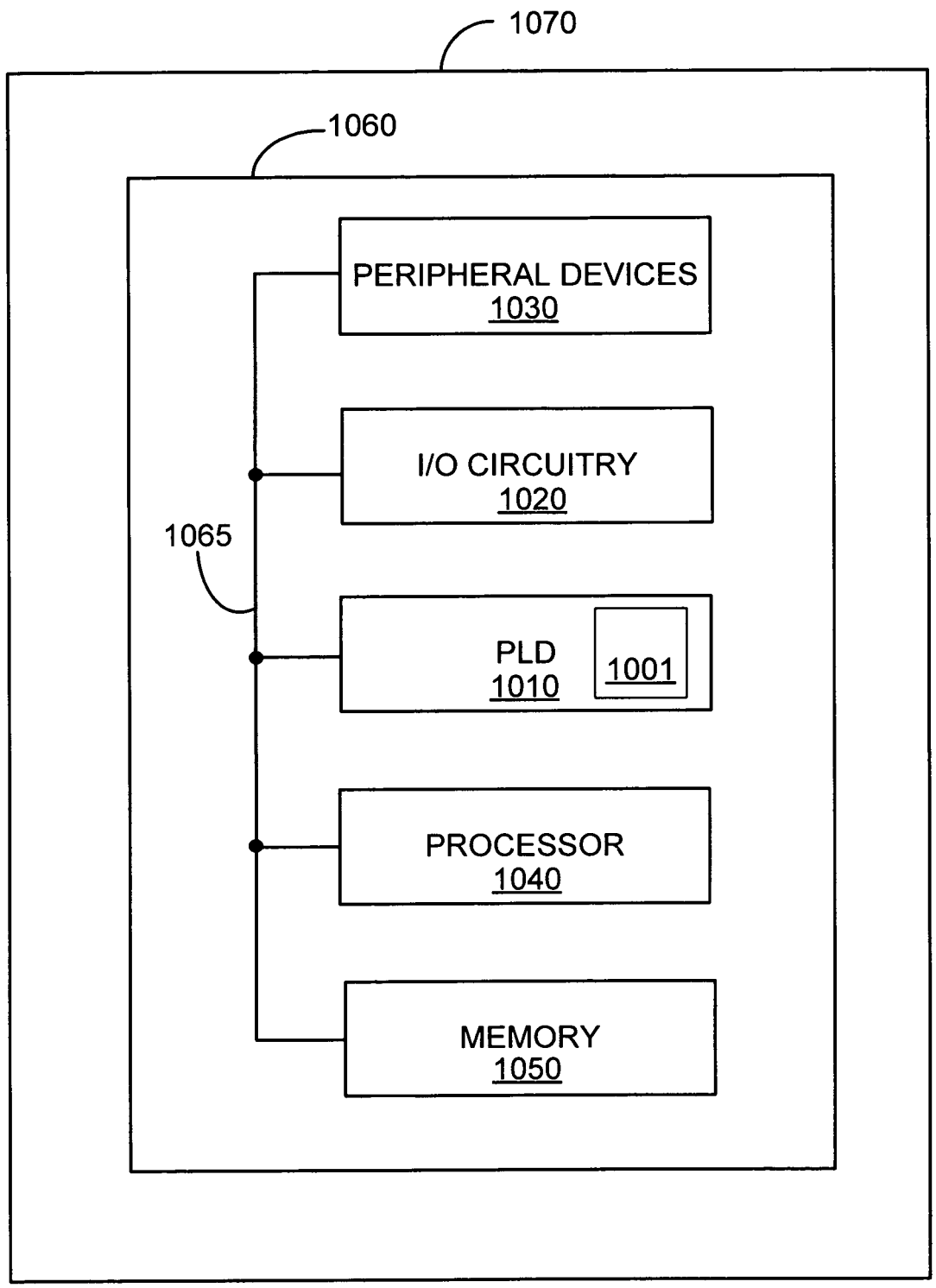
FIG. 10 illustrates an exemplary data processing system including an exemplary programmable logic device in which matrix decomposition circuits in accordance with the present invention might be implemented.

FIG. 10 illustrates an exemplary data processing system including an exemplary PLD in which matrix decomposition circuits in accordance with the present invention might be implemented. In FIG. 10, data processing system 1000, among other things, includes PLD 1010. As one example, matrix decomposition circuits of the present invention may be implemented in PLDs such as PLD 1010. In one embodiment, matrix decomposition circuit 1001 (such as matrix decomposition circuit 100 shown in FIG. 1) is on the same die/chip as PLD 1010. Data processing system 1000 may include one or more of the following components: processor 1040, memory 1050, input/output (I/O) circuitry 1020, and peripheral devices 1030. These components are coupled together by system bus 1065 and are populated on circuit board 1060 which is contained in end-user system 1070. A data processing system such as system 1000 may include a single end-user system such as end-user system 1070 or may include a plurality of systems working together as a data processing system.

System 1000 can be used in a wide variety of applications, such as computer networking, data networking, instrumentation, video processing, digital signal processing (DSP), or any other application where the advantage of using programmable or reprogrammable logic is desirable. PLD 1010 can be used to perform a variety of different logic functions. For example, PLD 1010 can be configured as a processor or controller that works in cooperation with processor 1040 (or, in alternative embodiments, a PLD might itself act as the sole system processor). PLD 1010 may also be used as an arbiter for arbitrating access to a shared resource in system 1000. In yet another example, PLD 1010 can be configured as an interface between processor 1040 and one of the other components in system 1000. It should be noted that system 1000 is only exemplary.

In one embodiment, system 1000 is a digital system. As used herein a digital system is not intended to be limited to a purely digital system, but also encompasses hybrid systems that include both digital and analog subsystems.

While the present invention has been particularly described with respect to the illustrated embodiments, it will be appreciated that various alterations, modifications and adaptations may be made based on the present disclosure, and are intended to be within the scope of the present invention. While the invention has been described in connection with what are presently considered to be the most practical and preferred embodiments, it is to be understood that the present invention is not limited to the disclosed embodiments but, on the contrary, is intended to cover various modifications and equivalent arrangements included within the scope of the appended claims.

| Pseudo-Code For Start Phase |
|---|
| IF (phase = START) THEN<br>  //Repeat for each update cycle of start phase<br>  FOR (start_cnt = 0 TO N−1) LOOP<br>    //Repeat for each matrix<br>    FOR (mtx_no=0 TO M−1) LOOP<br>      //Initialise variables<br>      diag_addr          = 0<br>      ncells_row        = N+1<br>      ncells_row_act   = start_cnt + 1 |

| Pseudo-Code For Start Phase |
| --- |
| ```
//process each required row of systolic array
FOR row_no=0 TO (floor(start_cnt/2)) LOOP
    //first cell address in row
    start_row_valid_cell   = diag_addr
    cell_addr              = start_row_valid_cell
    //generate cell addresses for cells to process in current row
    FOR (i=0 TO ncells_row_act-1) LOOP
        cell_addr          = cell_addr + i
    END FOR (i=0 TO ncells_row_act-1)
    //update variables for next row iteration
    ncells_row_act         -= 2
    diag_addr              += ncells_row
    ncells_row             --
END FOR row_no=0 TO (floor(start_cnt/2))
    END FOR (mtx_no=0 TO M-1)
END FOR (start_cnt = 0 TO N-1)
//setup variables required for next phase (middle or end)
ncells_row_raw             =N+1
END IF (phase = START)
``` |

| Pseudo-Code For Middle Phase |
| --- |
| ```
IF (phase = MIDDLE) THEN
  tempA                    = ncells_row_raw
  //Repeat for each matrix
  FOR (mtx_no=0 TO M-1) LOOP
    //Initialise variables
    diag_addr              = 0
    ncells_row             = N+1
    ncells_row_raw         = tempA
    //process each required row of systolic array
    FOR row_no=0 TO N-1 LOOP
      //first cell address in row
      start_row_valid_cell = diag_addr
      cell_addr            = start_row_valid_cell
      //determine number of cells to process in current row
      IF (ncells_row_raw > 0) THEN
          IF (ncells_row_raw > ncells_row) THEN
              ncells_row_act = ncells_row
          ELSE
              ncells_row_act = ncells_row_raw
          END IF (ncells_row_raw > ncells_row)
      ELSE
          ncells_row_act = 0
          EXIT (FOR row_no=0 TO N-1 LOOP)
      END IF (ncells_row_raw > 0)
      //generate cell addresses for cells to process in current row
      FOR (i=0 TO ncells_row_act-1) LOOP
          cell_addr        = cell_addr + i
      END FOR (i=0 TO ncells_row_act-1)
      //update variables for next row iteration
      ncells_row_raw       -=2
      diag_addr            +=ncells_row
      ncells_row           --
    END FOR row_no=0 TO N-1
  END FOR (mtx_n=0 TO M-1)
  ncells_row_raw           = tempA
  IF (ncells_row_raw != 2N) THEN
    ncells_row_raw++
  ELSE
    ncells_row_raw = 2N
  END IF (ncells_row_raw != 2N)
END IF (phase = MIDDLE)
``` |

| Pseudo-Code For End Phase |
| --- |
| ```
IF (phase = END) THEN
  // Repeat for each update of end phase
  FOR (end_cnt = 0 TO 2N-2) LOOP
    tempA                  = ncells_row_raw
    // Repeat for each matrix
    FOR (mtx_no=0 TO M-1) LOOP
      ncells_row_raw       = tempA
      //Determine variables for this update cycle in end phase
      IF (end_cnt < N) THEN
          ncells_row_del   = end_cnt + 1
          start_row_no     = 0
          diag_addr        = 0
          ncells_row       = N + 1
      ELSE
          IF (end_cnt = N) THEN
              ncells_row_del       = N - 1
          ELSE
              ncells_row_del       -=1
          END IF (end_cnt = N)
          start_row_no     = end_cnt - N + 1
          diag_addr        = next_diag_addr
          ncells_row       = next_ncells_row
      END IF (end_cnt < N)
      //Determine variables for next update cycle in end phase
      // Only used for updates N+1 of end phase onwards
      next_diag_addr       = diag_addr + ncells_row
      next_ncells_row      = ncells_row - 1
      //process each required row of systolic array
      FOR row_no=start_row_no TO N-1 LOOP
        //first cell address in row
        start_row_valid_cell = diag_addr + ncells_row_del
        cell_addr          =start_row_valid_cell
        //determine number of cells to process in current row
        IF (ncells_row_raw > 0) THEN
            IF (ncells_row_raw > ncells_row) THEN
                ncells_row_act = ncells_row -
                                 ncells_row_del
            ELSE
                ncells_row_act = ncells_row_raw -
                                 ncells_row_del
            END IF (ncells_row_raw > ncells_row)
        ELSE
            ncells_row_act = 0
            EXIT (FOR row_no= start_row_no TO N-1 LOOP)
        END IF (ncells_row_raw > 0)
        //generate cell addresses for cells to process in current row
        FOR (i=0 TO ncells_row_act-1) LOOP
            cell_addr      = cell_addr + i
        END FOR (i=0 TO ncells_row_act-1)
        //update variables for next row iteration
        ncells_row_raw     -=2
        diag_addr          += ncells_row
        ncells_row         --
        IF (ncells_row_del > 2) THEN
            ncells_row_del - =2
        ELSE
            ncells_row_del = 0
        END IF (ncells_row_del > 2)
      END FOR row_no=start_row_no TO N-1
    END FOR (mtx_no=0 TO M-1)
    //incrementing ncells_row_raw for next update in end phase
    ncells_row_raw         = tempA
    IF (ncells_row_raw != 2N) THEN
        ncells_row_raw++
    ELSE
        ncells_row_raw = 2N
    END IF (ncells_row_raw != 2N)
  END FOR (end_cnt = 0 TO 2N-2)
END IF (phase = END)
``` |

What is claimed is:

1. A matrix decomposition circuit comprising:
   a processing element to process a plurality of processing cells;
   a scheduler coupled to the processing element, wherein the scheduler instructs the processing element to process only processing cells with non-zero inputs of the plurality of processing cells;
   an internal memory;
   an output interface (I/F); and a demultiplexer coupled to the internal memory, the scheduler, and the output I/F, wherein the demultiplexer sends output of the internal memory to the scheduler or the output I/F, wherein a first output terminal of the demultiplexer is coupled to the scheduler and a second output terminal of the demultiplexer is coupled to the output I/F.

2. The matrix decomposition circuit of claim 1, wherein the processing element processes a systolic array including a plurality of systolic cells, wherein the plurality of systolic cells are the plurality of processing cells.

3. The matrix decomposition circuit of claim 2, wherein the internal memory is coupled to the scheduler and the processing element, and further wherein the internal memory stores data calculated by the processing element.

4. The matrix decomposition circuit of claim 3, wherein the internal memory comprises:
a rotation angles memory that stores rotation angle values calculated by the processing element, wherein the rotation angles memory is a first-in first-out (FIFO) memory;
a systolic cell internal input values memory that stores systolic cell internal input values, wherein the systolic cell internal input values memory is a FIFO memory; and
a systolic cell values memory that stores systolic cell values, wherein the systolic cell values memory is an addressable memory.

5. The matrix decomposition circuit of claim 2, further comprising:
an input I/F; and
an input memory coupled to the input I/F and the scheduler, wherein the input memory stores input matrix values and input column vector values.

6. The matrix decomposition circuit of claim 5, wherein the internal memory comprises the input memory.

7. A programmable logic device including the matrix decomposition circuit of claim 1.

8. A digital system comprising a programmable logic device including the matrix decomposition circuit of claim 1.

9. A method comprising:
selecting M input matrices from Mtotal input matrices to feed into a decomposition circuit to decompose in parallel, where M is an integer less than Mtotal, where Mtotal is an integer;
feeding the M input matrices into the decomposition circuit; and
decomposing the M input matrices, wherein the decomposing includes processing only processing cells with non-zero inputs, wherein the processing cells are included in a plurality of processing cells that are processed by a processing element;
wherein Mtotal input matrices are decomposed to Mtotal output matrices,
wherein M is equal to ceil(2*PE_delay/N(N+3)), where PE_delay represents processing delay through the processing element and N is an integer that represents input matrix order.

10. The method of claim 9 further comprising:
sending data and control information from a scheduler to the processing element, wherein the data and control information are used in the processing.

11. The method of claim 9, wherein M is a minimum number required to ensure that processing element latency is hidden.

12. The method of claim 11 further comprising:
performing a first update for the M input matrices in order of increasing matrix number;
thereafter performing a second update for the M input matrices in order of increasing matrix number; and
thereafter performing all remaining updates in order of increasing update number, wherein for each update, the each update is performed for the M input matrices in order of increasing matrix number prior to proceeding to performing a next update.

13. The method of claim 9 further comprising:
assigning processing cells for calculating non-zero elements of an output matrix, wherein boundary cells calculate diagonal elements of the output matrix and internal cells calculate non-diagonal elements of the output matrix.

14. The method of claim 13, wherein a boundary cell calculates a rotation angle and a boundary cell systolic value and an internal cell calculates a systolic internal input value and an internal cell systolic value.

15. The method of claim 14 further comprising:
storing systolic cell values in memory; and
reading systolic cell values out of the memory in an order suited for back-substitution.

16. The method of claim 13 further comprising:
generating a reset value between zero and one for boundary cells; and
generating a reset value of zero for internal cells.

17. A matrix decomposition circuit comprising:
a processing element to process a plurality of processing cells;
a scheduler coupled to the processing element, wherein the scheduler instructs the processing element to process only processing cells with non-zero inputs;
a memory coupled to the processing element and the scheduler, the memory including:
a rotation angles memory that stores rotation angle values calculated by the processing element, wherein the rotation angles memory is a first-in first-out (FIFO) memory;
a systolic cell internal input values memory that stores systolic cell internal input values, wherein the systolic cell internal input values memory is a FIFO memory; and
a systolic cell values memory that stores systolic cell values, wherein the systolic cell values memory is an addressable memory;
an output interface (I/F); and
a demultiplexer coupled to the memory, the scheduler, and the output I/F, wherein the demultiplexer sends output of the memory to the scheduler or the output I/F,
wherein a first output terminal of the demultiplexer is coupled to the scheduler and a second output terminal of the demultiplexer is coupled to the output I/F.

18. A programmable logic device including the matrix decomposition circuit of claim 17.

19. A digital system comprising a programmable logic device including the matrix decomposition circuit of claim 17.

* * * * *